US012351228B2

(12) United States Patent
Ota

(10) Patent No.: US 12,351,228 B2

(45) Date of Patent: Jul. 8, 2025

(54) TRANSPORTATION DEVICE

(71) Applicant: Hiroshi Ota, Kanagawa (JP)

(72) Inventor: Hiroshi Ota, Kanagawa (JP)

(73) Assignee: OTA Hiroshi, Kanagawa (JP)

( * ) Notice: Subject to any disclaimer, the term of this patent is extended or adjusted under 35 U.S.C. 154(b) by 744 days.

(21) Appl. No.: 17/665,580

(22) Filed: Feb. 6, 2022

(65) Prior Publication Data

US 2022/0161837 A1 May 26, 2022

Related U.S. Application Data

(63) Continuation of application No. PCT/JP2020/026767, filed on Jul. 8, 2020.

(30) Foreign Application Priority Data

Aug. 16, 2019 (JP) ................................ 2019-149279

(51) Int. Cl.

*B62D 57/024* (2006.01)
*B62B 5/00* (2006.01)
*B62B 5/02* (2006.01)

(52) U.S. Cl.

CPC ............ *B62B 5/025* (2013.01); *B62B 5/0003* (2013.01)

(58) Field of Classification Search

CPC ....... B62B 5/0003; B62B 5/025; B62D 15/00; B62D 57/024; B62D 61/12; B62D 63/02

(Continued)

(56) References Cited

U.S. PATENT DOCUMENTS 6,695,084 B2 * 2/2004 Wilk ...................... A61G 5/068 180/117
7,246,671 B2 7/2007 Goren
(Continued)

FOREIGN PATENT DOCUMENTS

CN 109050700 A 12/2018
CN 110001817 A 7/2019
(Continued)

OTHER PUBLICATIONS

Keigo Takishima et al., "Development of the robot which can climb spiral staircases", The Japan Society of Mechanical Engineers Kanto Branch, Proceedings of the 24th general meeting and lectures, OS0401, [Mar. 17-18, 2018, (Tokyo) ].

(Continued)

*Primary Examiner* — Valentin Neacsu
*Assistant Examiner* — Felicia L. Brittman-Alabi

(57) ABSTRACT

Provided is a transportation device for loading a cargo and moving in a moving direction, comprising: a bed for loading a cargo thereon; four leg parts for being able to receive a part of a weight of the bed individually; a movable part for moving the leg parts individually to change relative positions with respect to the bed individually; and a control part for controlling the movable part for the four leg parts individually, wherein the control part is for changing the relative position of at least one of the four leg parts with respect to the bed within a range in which a center of gravity of the bed is located inside a profile of a horizontal triangle made by three leg parts among the four leg parts as apexes, causing the three leg parts to support the bed and releasing one remaining leg part from supporting the bed.

17 Claims, 69 Drawing Sheets

(58) Field of Classification Search
USPC .......................................................... 280/5.24
See application file for complete search history.

(56) References Cited

U.S. PATENT DOCUMENTS

| | | | | |
|---|---|---|---|---|
| 8,418,787 | B2 | 4/2013 | Bouhraoua | |
| 9,629,761 | B2 | 4/2017 | Hacikadiroglu | |
| 2003/0127259 | A1 * | 7/2003 | Logstrup | B62B 5/02 180/23 |
| 2019/0030275 | A1 | 1/2019 | Darkin | |
| 2019/0231617 | A1 | 8/2019 | Cazali | |
| 2020/0000659 | A1 | 1/2020 | Linscott | |

FOREIGN PATENT DOCUMENTS

| | | | |
|---|---|---|---|
| JP | S60155385 | A | 8/1985 |
| JP | S60215480 | A | 10/1985 |
| JP | H02262484 | A | 10/1990 |
| JP | H1159515 | A | 3/1999 |
| JP | 2001233600 | A | 8/2001 |
| JP | 2003146218 | A | 5/2003 |
| JP | 2007153521 | A | 6/2007 |
| WO | 0153137 | A1 | 7/2001 |

OTHER PUBLICATIONS (ISA/237) Written Opinion of the International Search Authority for International Patent Application No. PCT/JP2020/026767 , issued/mailed by the Japan Patent Office on Aug. 11, 2020.

Yichi Ma et al., "Design of a Wheel-Legged Stair Climbing Robot",2021 7th International Conference on Control, Automation and Robotics, Authorized licensed use limited to:Hiroshi Ohta. Downloaded on Jul. 18, 2021 at 13:30:31, pp. 146-150.

Diego Delgado Mena et al., "Control architecture for a novel Leg-Based Stair-Climbing Wheelchair",Published in: 2021 European Conference on Mobile Robots (ECMR), Date of Conference:Aug. 31-Sep. 3, 2021,Date Added to IEEE Xplore:Oct. 22, 2021.

Max Schwarz et al., "Hybrid Driving-Stepping Locomotion with the Wheeled-legged Robot Momaro", IEEE International Conference on Robotics and Automation (ICRA), Stockholm, Sweden, May 2016.

Office Action issued for counterpart Chinese Application 202080057477.7, issued by the State Intellectual Property Office of People's Republic of China on Oct. 10, 2023.

* cited by examiner

TRANSPORTATION DEVICE

The contents of the following Japanese and International patent applications are incorporated herein by reference:

No. 2019-149279 filed on Aug. 16, 2019, and

No. PCT/JP2020/026767 filed on Jul. 8, 2020.

BACKGROUND

1. Technical Field

The present invention relates to a transportation device.

2. Related Art

There is a transportation device that travels with cargo or people being loaded on a bed (See, e.g., Patent Documents 1 through 4 and Non-Patent Document).

PRIOR ART DOCUMENT

Patent Documents

Patent Document 1: Japanese Patent Application Publication No. 2001-233600

Patent Document 2: Japanese Patent Application Publication No. 2003-146218

Patent Document 3: Japanese Patent Application Publication No. S60-155385

Patent Document 4: Japanese Patent Application Publication No. 2007-153521

Non-Patent Document: The Japan Society of Mechanical Engineers Kanto Branch, Proceedings of the 24th general meeting and lectures, OS0401 "Development of Orthogonal Four-Legged Wheel Robot that can Move Cockle Stairs"

DESCRIPTION OF EXEMPLARY EMBODIMENTS

Next, the present invention will be described by means of the embodiments of the invention. The embodiments below are not intended to limit the invention defined by the claims. All combinations of features set forth in the embodiments below are not necessarily essential to the solutions of the invention.

Figure 1:
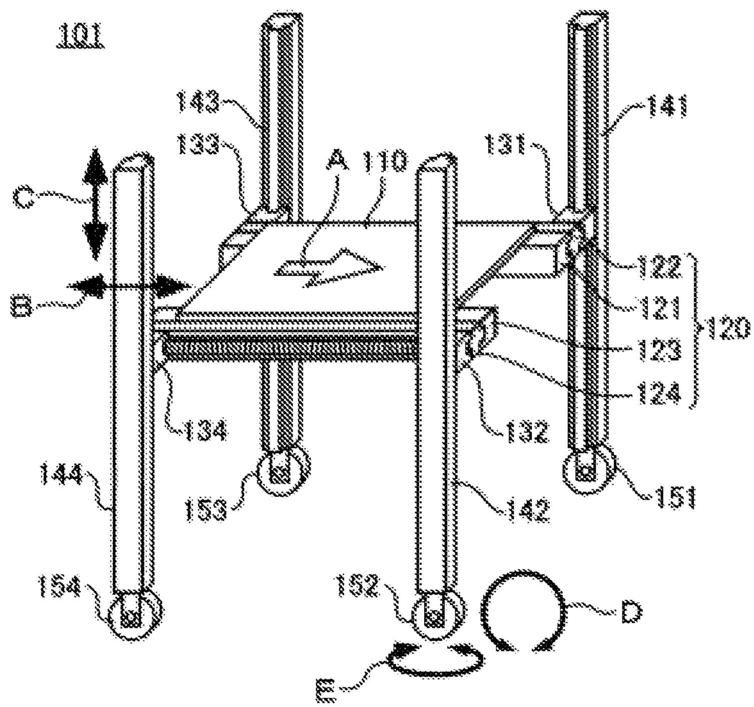
FIG. 1 illustrates a schematic perspective view of a transportation device 101 according to an embodiment.

FIG. 1 is a schematic perspective view of a transportation device 101 according to an embodiment. The transportation device 101 comprises a bed 110, a rail part 120, movable units 131, 132, 133, 134, and leg parts 141, 142, 143, 144.

The bed 110 has a flat and horizontal loading face on its upper surface, on which loading face a cargo to be transported is loaded. The cargo may be, in addition to a general cargo, a wheelchair with a person thereon, for example. Note that, in the drawing, an arrow A presented on the loading face indicates a provisional advancing direction of the transportation device 101. In the description hereinbelow, the direction indicated by the arrow A is intended to be the advancing direction A when the transportation device 101 moves straight forward.

The rail part 120 has a pair of fixed rails 121, 123 located below the bed 110 in the drawing and parallel with each other, as an example of first rails. The fixed rails 121, 123 are disposed on the lower surface of the bed 110 in the drawing, parallel to the advancing direction of the bed 110 along the both side ends of the bed 110, and fixed to the bed 110.

The rail part 120 has a pair of movable rails 122, 124 that are fitted to the fixed rails 121, 123, as an example of second rails. The movable rails 122, 124 respectively are slidably fitted to the fixed rails 121, 123 so that they are disposed along the side ends of the bed 110 on the outside of the bed 110. Whereby, the movable rails 122, 124 are displaced so as to project forward or rearward from the bed 110 in the advancing direction of the bed 110.

Note that the rail part 120 has a driving part (not shown), for each of the movable rails 122, 124 individually, which generates the driving force to slide the movable rails 122, 124 with respect to the fixed rails 121, 123. The driving part uses an electric motor, for example, to slide the movable rails 122, 124 with respect to the fixed rails 121, 123. Moreover, the driving part regulates the sliding of the movable rails 122, 124 by braking when the movable rails 122, 124 are not sliding with respect to the fixed rails 121, 123. The sliding and fixing of the movable rails 122, 124 can be controlled individually from the outside of the rail part 120 by an electric signal or the like.

The movable units 131, 132, 133, 134 are an example of a movable part wherein, in the state as shown in FIG. 1, they are arranged near four corners of the bed 110, and one pair of the movable units 131, 133 are fitted to one movable rail 122 while the other pair of the movable units 132, 134 are fitted to the other movable rail 124. The movable units 131, 132, 133, 134 respectively slide along the movable rails 122, 124 they are fitted to in the extending direction of the movable rails 122, 124.

The movable units 131, 132, 133, 134 each have a prime motor such as an electric motor individually so that they respectively move along the movable rails 122, 124. Whereby, the movable units 131, 132, 133, 134 can move along the movable rails 122, 124, i.e., in the horizontal direction as shown by an arrow B in the drawing. Moreover, the movable units 131, 132, 133, 134 are regulated as to the sliding with respect to the movable rails 122, 124 when the movable units 131, 132, 133, 134 are not sliding with respect to the movable rails 122, 124. Whereby, relative positions of the movable units 131, 132, 133, 134 with respect to the rail part 120 and the bed 110 in the horizontal direction can be controlled individually from the outside of the rail part 120 by an electric signal or the like.

The leg parts 141, 142, 143, 144 respectively are held to the movable units 131, 132, 133, 134 from the side and joined to the bed 110 via the movable units 131, 132, 133, 134, the movable rails 122, 124, and the fixed rails 121, 123. The leg parts 141, 142, 143, 144 respectively are fitted to the movable units 131, 132, 133, 134 from the side and can slide vertically with respect to the movable units 131, 132, 133, 134, as shown by an arrow C in the drawing.

The movable units 131, 132, 133, 134 each have a prime motor such as an electric motor individually so that they respectively move the leg parts 141, 142, 143, 144 with respect to the movable rails 122, 124. Whereby, the leg parts 141, 142, 143, 144 respectively can move along the movable units 131, 132, 133, 134, i.e., in the vertical direction in the drawing.

Moreover, the movable units 131, 132, 133, 134 regulate the sliding of the leg parts 141, 142, 143, 144 when the leg parts 141, 142, 143, 144 are not sliding with respect to the movable units 131, 132, 133, 134. Whereby, relative positions of the leg parts 141, 142, 143, 144 with respect to the rail part 120 and the bed 110 in the vertical direction can be changed individually from the outside of the movable units 131, 132, 133, 134.

Note that, in the shown example, the leg parts 141, 142, 143, 144 are located outside an assembly of the bed 110 and the rail part 120 when seen in a plan view of the transportation device 101. Whereby, raising and lowering of the movable units 131, 132, 133, 134 along the leg parts 141, 142, 143, 144 are not obstructed by the bed 110 and the rail part 120, facilitating an amount of movement of the leg parts 141, 142, 143, 144 in the vertical direction to be increased.

Further, the leg parts 141, 142, 143, 144 respectively have traveling units 151, 152, 153, 154 which form traveling parts at their individual lower ends. The traveling units 151, 152, 153, 154 each has a drive wheel that rotates as shown by an arrow D in the drawing or stops.

Moreover, the traveling units 151, 152, 153, 154 regulates the rotation of the drive wheels for which the driving force is not produced to brake the traveling of the leg parts 141, 142, 143, 144 provided with these traveling units 151, 152, 153, 154. Further, the traveling units 151, 152, 153, 154 each can rotate about a vertical axis as shown by an arrow E in the drawing to change the advancing direction of the leg parts 141, 142, 143, 144 on which the driving force by the drive wheels is acted. These rotation and braking of the drive wheels as well as the traveling direction by the drive wheels can be controlled individually for each of the traveling units 151, 152, 153, 154.

Figure 2:
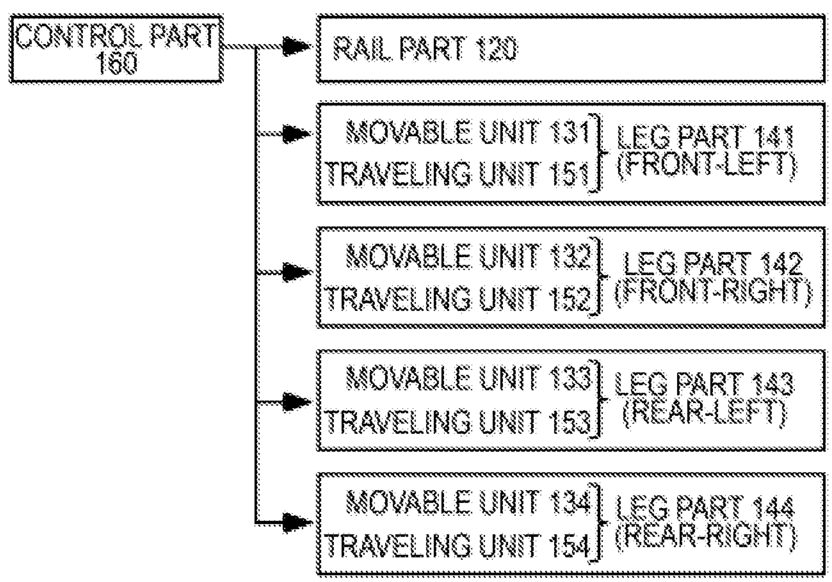
FIG. 2 illustrates a block diagram showing a control system of the transportation device 101.

FIG. 2 is a block diagram schematically showing a configuration of a control part 160 that can be provided to the transportation device 101. As shown, the control part 160 transfers an instruction individually for each of the rail part 120 and the leg parts 141, 142, 143, 144.

Further, the control part 160 can individually specify, when the rail part 120 is facing the advancing direction A, the relative position of the left movable rail 122 with respect to the bed 110 and the relative position of the right movable rail 124 with respect to the bed 110. Whereby, the relative positions of the leg parts 141, 142, 143, 144, which are fitted to the movable rails 122, 124 via the movable units 131, 132, 133, 134, with respect to the bed 110 can be specified individually on the left and right sides of the bed 110. Moreover, when seen from a different perspective, the relative position of the bed 110 with respect to the leg parts 141, 142, 143, 144 that are fixed in one arrangement can be changed to the direction parallel to the advancing direction A.

Furthermore, the control part 160 can instruct the movable units 131, 132, 133, 134 individually, thereby instructing the positions in the horizontal direction and vertical direction of the respective leg parts 141, 142, 143, 144 with respect to the bed 110 for each of the leg parts 141, 142, 143, 144, individually. By combining these instructions for the rail parts 120 and the movable units 131, 132, 133, 134, the control part 160 can set arbitrarily the relative positions of the leg parts 141, 142, 143, 144 with respect to the bed 110 in a wide range.

Further, the control part 160 can specify individually, for each of the leg parts 141, 142, 143, 144, the traveling speed and traveling direction of each of the traveling units 151, 152, 153, 154, thereby, for each of the corresponding movable units 131, 132, 133, 134 and the traveling units 151, 152, 153, 154, specifying the traveling speed including a stopped state and braked state and specifying the traveling direction individually for each of the leg parts 141, 142, 143, 144.

Figure 3:
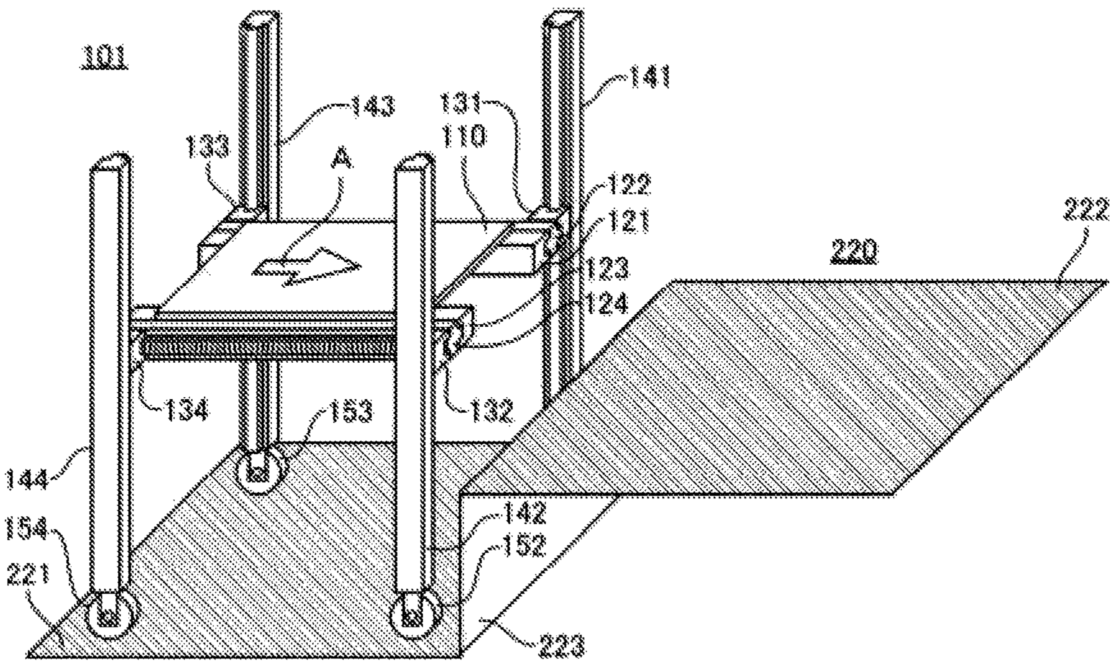
FIG. 3 illustrates a schematic perspective view describing an operation of the transportation device 101 to move past a step.
Figure 4:
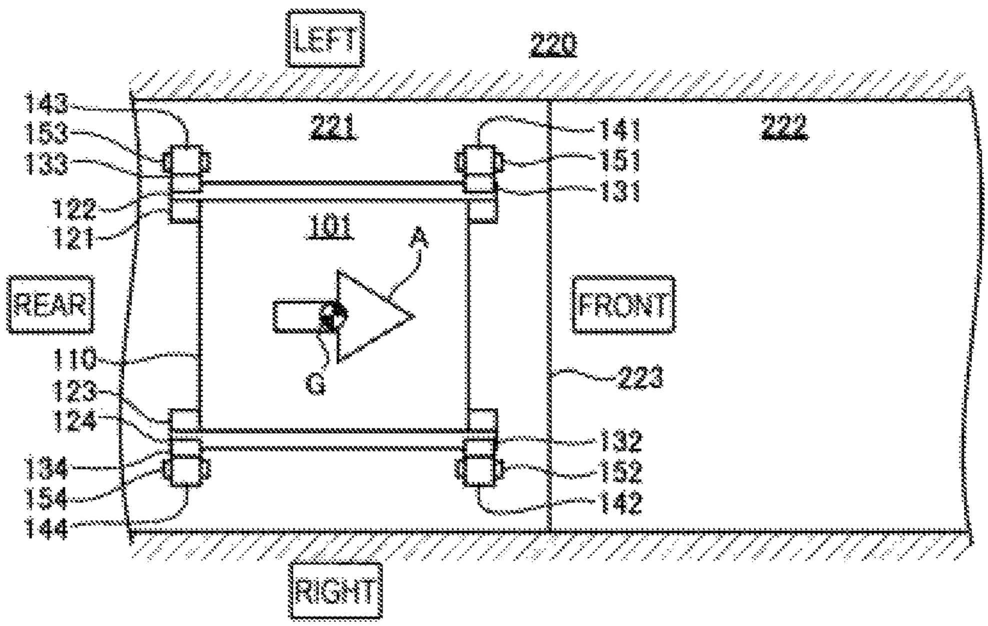
FIG. 4 illustrates a schematic plan view describing an operation of the transportation device 101 to move past a step.

FIG. 3 is a drawing illustrating a state where the transportation device 101 travels a route 220 having a step 223 in midway. Moreover, FIG. 4 is a schematic plan view shown from a perspective looking down on the transportation device 101 in the same state as FIG. 3.

Note that, in the description hereinbelow, forward and rearward as for the moving direction A of the transportation device 101 are denoted as "front" and "rear," respectively, and left and right sides when facing forward are described as "left" and "right," respectively, as shown in the drawing. This description similarly applies to the description of other drawings hereinbelow.

The route 220 has the step 223 that forms a vertical rise between a lower step 221 and an upper step 222. The transportation device 101 is initially located on the lower step 221 and moves to the right side in the drawing. Moreover, it climbs over the step 223 during the course of movement.

Similar to the state shown in FIG. 1, and as shown in FIG. 3, the control part 160 arranges four leg parts 141, 142, 143, 144 near four corners of the bed 110. Thus, the bed 110 is supported by four leg parts 141, 142, 143, 144 at four points. The center of gravity G located at the center of the bed 110 is located approximately equidistant from the four leg parts 141, 142, 143, 144, and their support of the bed 110 is stable.

Moreover, the control part 160 orients all the drive wheels of the traveling units 151, 152, 153, 154 parallel to the moving direction A. In this state, the control part 160 rotates all the drive wheels of the traveling units 151, 152, 153, 154 in the same direction to move the transportation device 101 straight along the route 220. In time, the transportation device 101 reaches immediately before the step 223.

Figure 5:
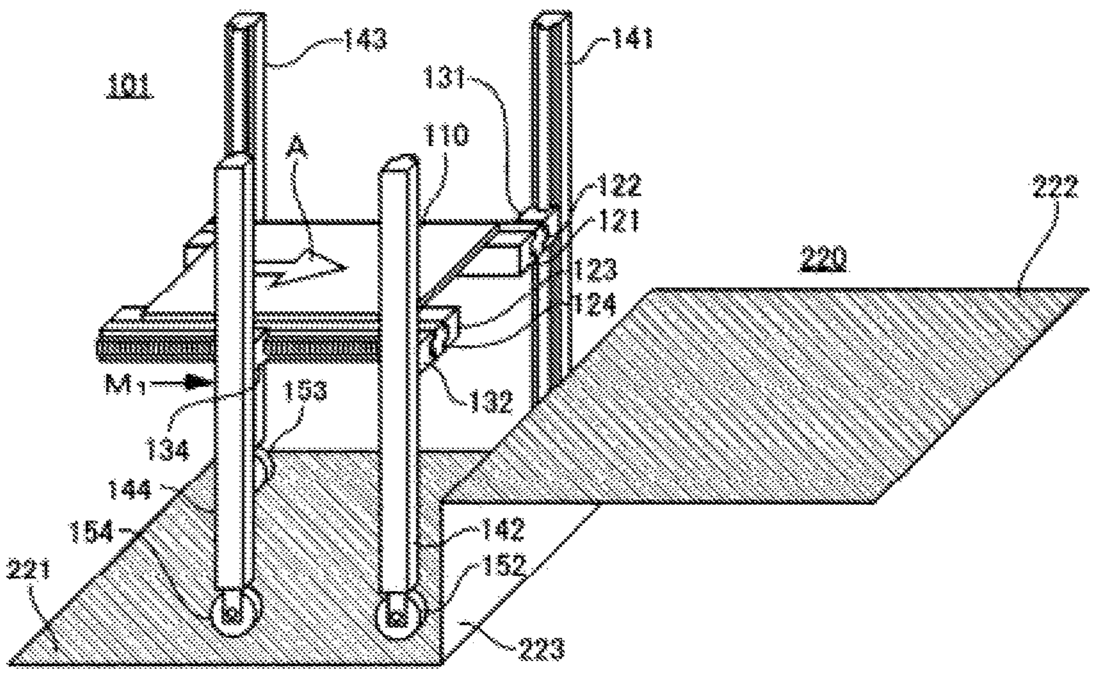
FIG. 5 illustrates a schematic perspective view describing an operation of the transportation device 101 to move past a step.

FIG. 5 is a drawing describing a step-up operation of the transportation device 101 to climb over the step 223 in the route 220. Moreover, FIG. 6 is a schematic plan view shown from a perspective looking down on the transportation device 101 in the same state as FIG. 5.

Next, while the traveling units 151, 152, 153 of three leg parts 141, 142, 143 are stopped, the control part 160 operates the movable unit 134 of the fourth rear-right leg part 144 to change the relative position of the leg part 144 with respect to the bed 110 horizontally, as shown by an arrow $M_1$ in the drawing. Whereby, the leg part 144 moves to near the center of the bed 110 as for the moving direction A.

When moving the leg part 144, the control part 160 may also rotate the drive wheel of the traveling unit 154 in the forward direction so that it cooperates with the movable unit 134. Whereby, the leg part 144 can move smoothly.

Figure 6:
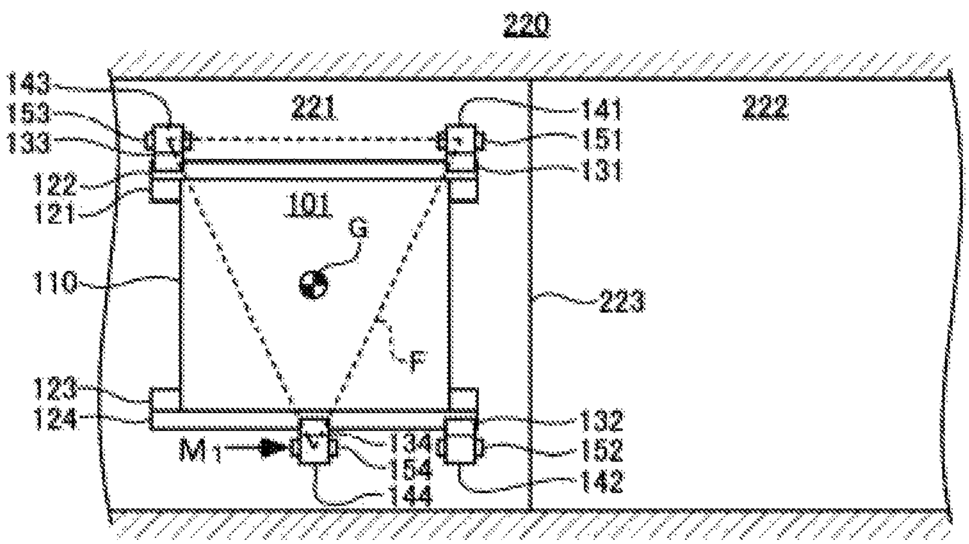
FIG. 6 illustrates a schematic plan view describing an operation of the transportation device 101 to move past a step.

When the leg part 144 is located at the center of the bed 110 as for the moving direction A, the center of gravity G of the bed 110 is located inside a triangle made by three leg parts 141, 143, 144 as apexes and near the center of the triangle, as shown as a triangle F in FIG. 6. Thus, using three leg parts 141, 142, 143, the bed 110 can be supported stably at three points different in the horizontal direction.

Figure 7:
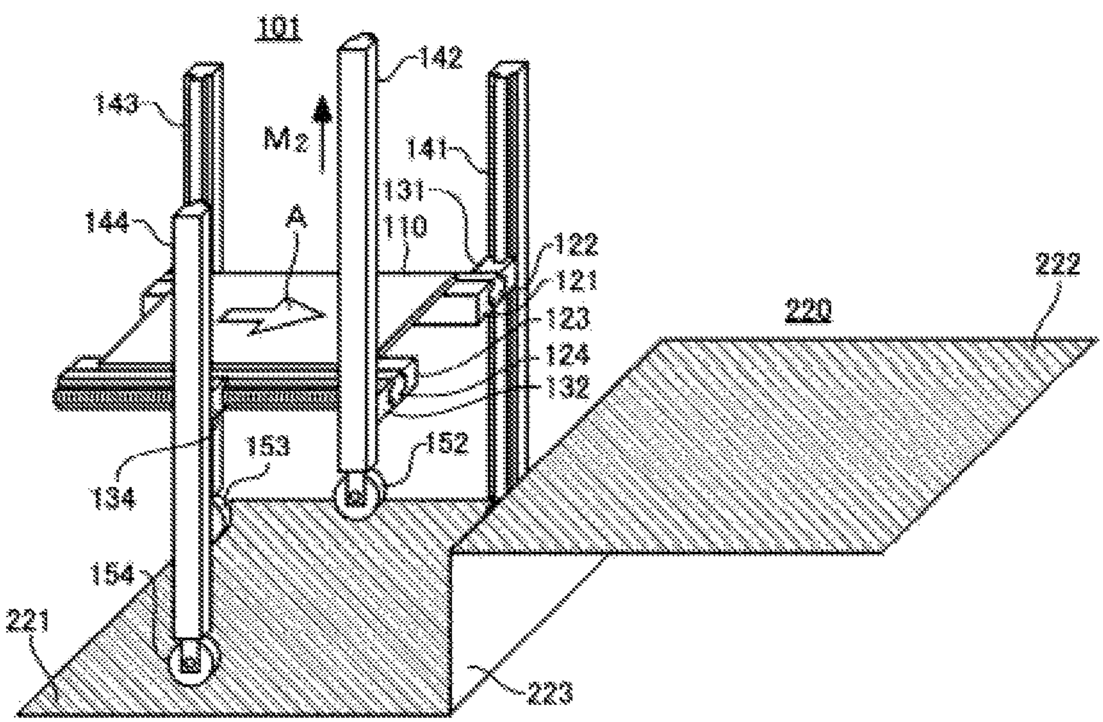
FIG. 7 illustrates a schematic perspective view describing an operation of the transportation device 101 to move past a step.

FIG. 7 is a drawing describing the next stage in the step-up operation of the transportation device 101. Moreover, FIG. 8 is a schematic plan view shown from a perspective looking down on the transportation device 101 in the same state as FIG. 7.

The control part 160 next operates the front-right movable unit 132 to raise the front-right leg part 142 as shown by an arrow $M_2$ in the drawing. Whereby, the traveling unit 152 of the leg part 142 changes its relative position in the vertical direction with respect to the bed 110 until it reaches a level at least higher than the floor surface of the upper step 222 of the route 220. Then, as shown by a dashed line in the drawing, the front-right leg part 142 is released from its role to support the bed 110.

Figure 8:
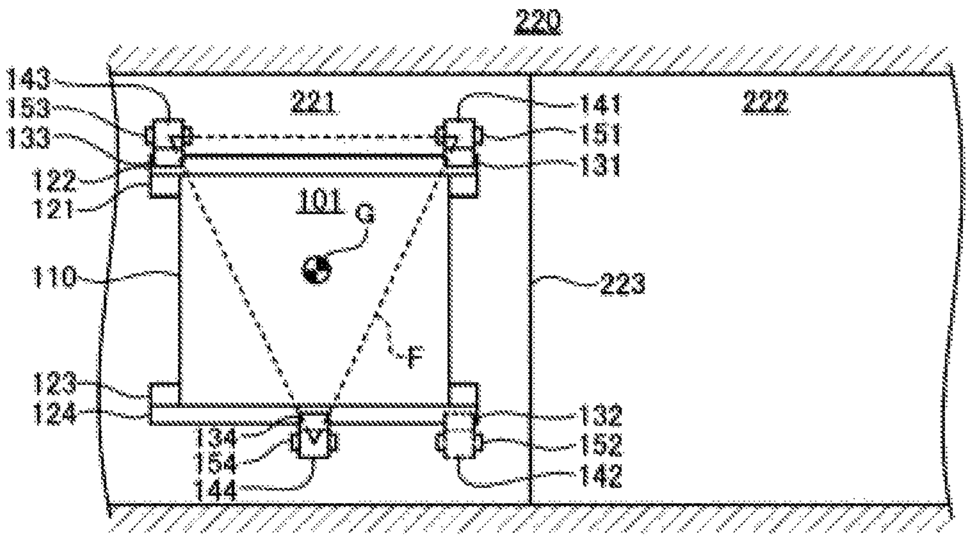
FIG. 8 illustrates a schematic plan view describing an operation of the transportation device 101 to move past a step.

Note that, as shown in FIG. 8, the bed 110 is supported by three leg parts 141, 143, 144 other than the leg part 142. Therefore, even when the operation described above separates the leg part 142 away from the floor surface of the lower step 221, the bed 110 is supported stably by three leg parts 141, 142, 143.

Figure 9:
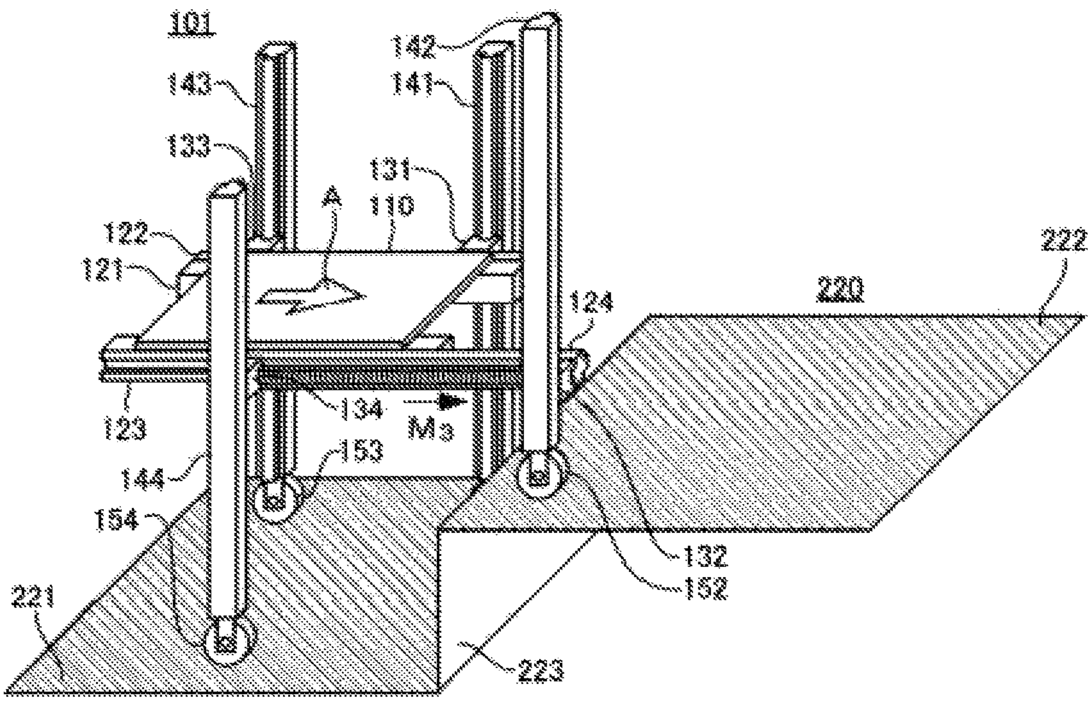
FIG. 9 illustrates a schematic perspective view describing an operation of the transportation device 101 to move past a step.
Figure 10:
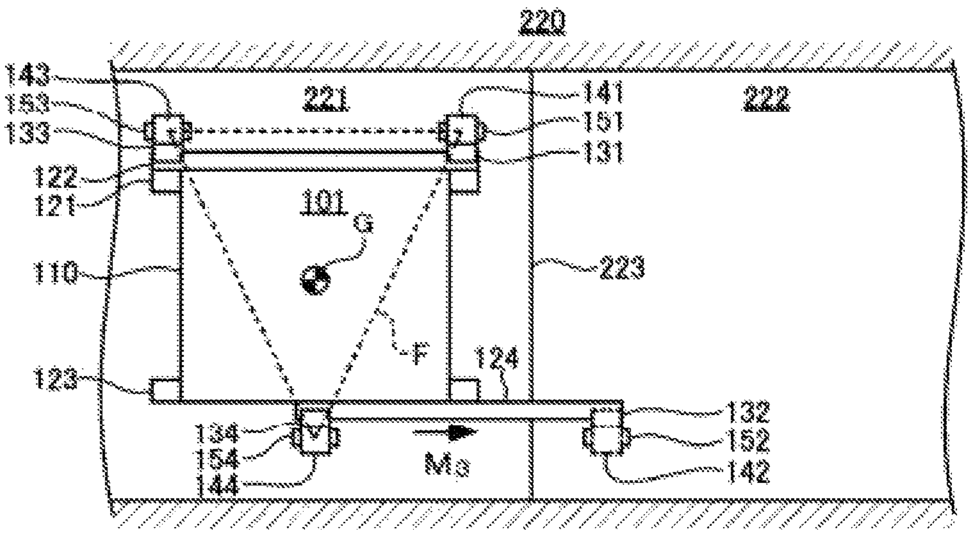
FIG. 10 illustrates a schematic plan view describing an operation of the transportation device 101 to move past a step.

FIG. 9 is a drawing describing the next stage in the step-up operation of the transportation device 101. Moreover, FIG. 10 is a schematic plan view shown from a perspective looking down on the transportation device 101 in the same state as FIG. 9.

The control part 160 next moves forward the movable rail 124 coupled to the leg part 142 via the movable unit 132 in the moving direction A, as shown by an arrow $M_3$ in the drawing. Moreover, while the movable rail 124 is moving forward, the control part 160 operates the movable unit 134 at the same speed in the opposite direction to the movable unit 132. Whereby, even when the movable rail 124 moves forward, the rear-right leg part 144 continues staying at the central position of the bed 110 as for the moving direction A.

With a series of these operations, the movable rail 124 moves forward until its rear end reaches the position of the leg part 144. At this time, the front end of the movable rail 124 moves to the position where it extends forward beyond the bed 110 while holding the leg part 142, thereby moving the leg part 142 to above the upper step 222 of the route 220.

Note that the control part 160 may hold the traveling unit 152 higher than the floor surface of the upper step 222 until the leg part 142 climbs over the step 223, and then ground the traveling unit 152 on the floor surface of the upper step 222 after the leg part 142 comes to above the upper step 222. Whereby, it can obviate an accident of the traveling unit 152 contacting the step 223 during the course of forward movement of the leg part 142, for example.

Figure 11:
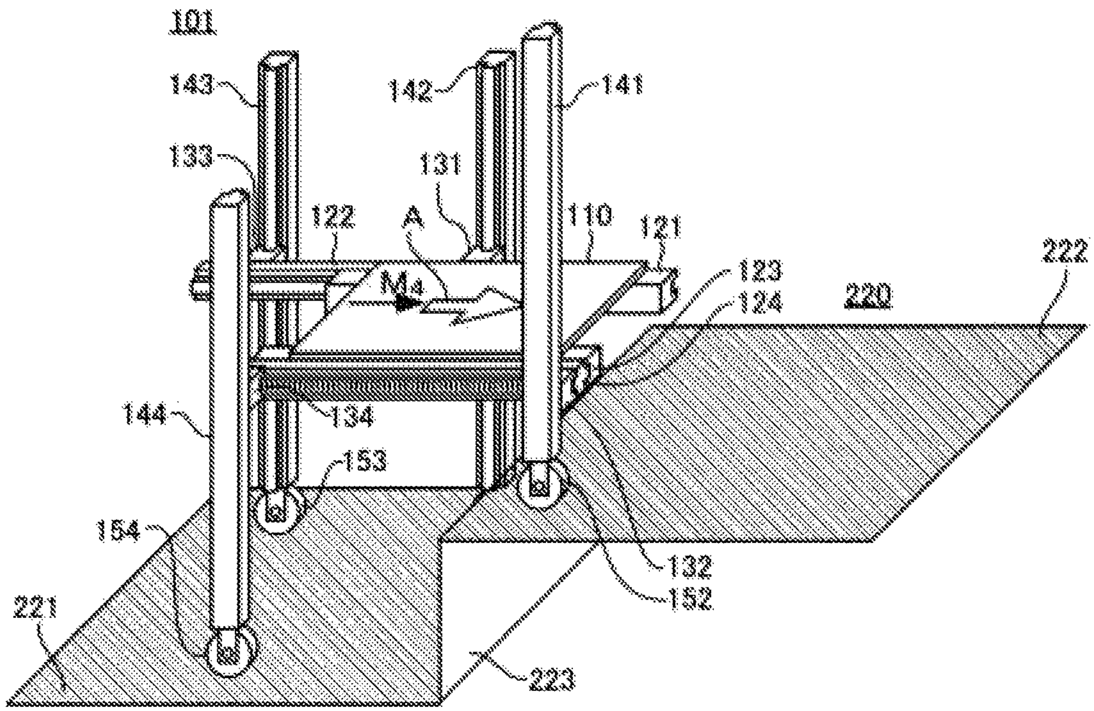
FIG. 11 illustrates a schematic perspective view describing an operation of the transportation device 101 to move past a step.
Figure 12:
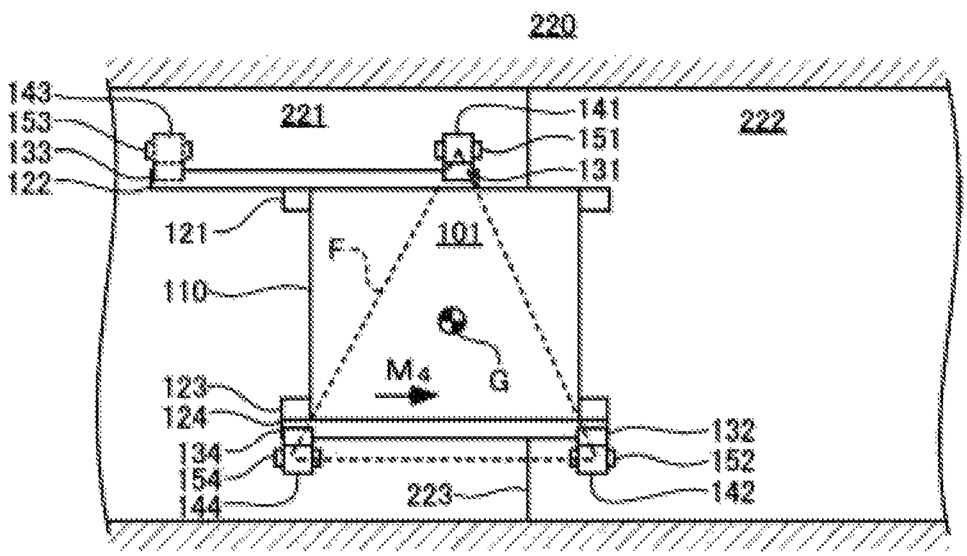
FIG. 12 illustrates a schematic plan view describing an operation of the transportation device 101 to move past a step.

FIG. 11 is a drawing describing the next stage in the step-up operation of the transportation device 101. Moreover, FIG. 12 is a schematic plan view shown from a perspective looking down on the transportation device 101 in the same state as FIG. 11.

The control part 160 next operates the driving part that moves the movable rail 122 with respect to the fixed rail 121 and the driving part that moves the movable rail 124 with respect to the fixed rail 123 simultaneously at the same speed, thereby moving the bed 110 supported by the fixed rails 121, 123 forward in the moving direction A, as shown by an arrow $M_4$ in the drawing. Whereby, the bed 110, which has moved forward in the moving direction A, comes to the upper step 222 of the route 220 and moves to near the front end of the movable rail 124 coupled to the leg part 142 via the movable unit 132.

In this manner, by the position of the bed 110 having moved forward, the load by the bed 110 is applied on three leg parts 141, 142, 144 located at the front side of the transportation device 101. Moreover, the rear-left leg part 143 located at the rearmost is released from its role to support the bed 110. However, as shown in FIG. 11, the bed 110 is still supported by three leg parts 141, 142, 144, the center of gravity G of the bed 110 is located near the center inside the triangle F made by three leg parts 141, 142, 144 located at the front side as for the moving direction A as apexes, and their support of the bed 110 is stable.

In this manner, the control part 160 can move the center of gravity of the entire transportation device 101 by relatively moving the bed 110 with respect to the leg parts 141, 142, 143, 144, in a way, to switch the combinations of three leg parts to support the bed 110 among four leg parts 141, 142, 143, 144.

Figure 13:
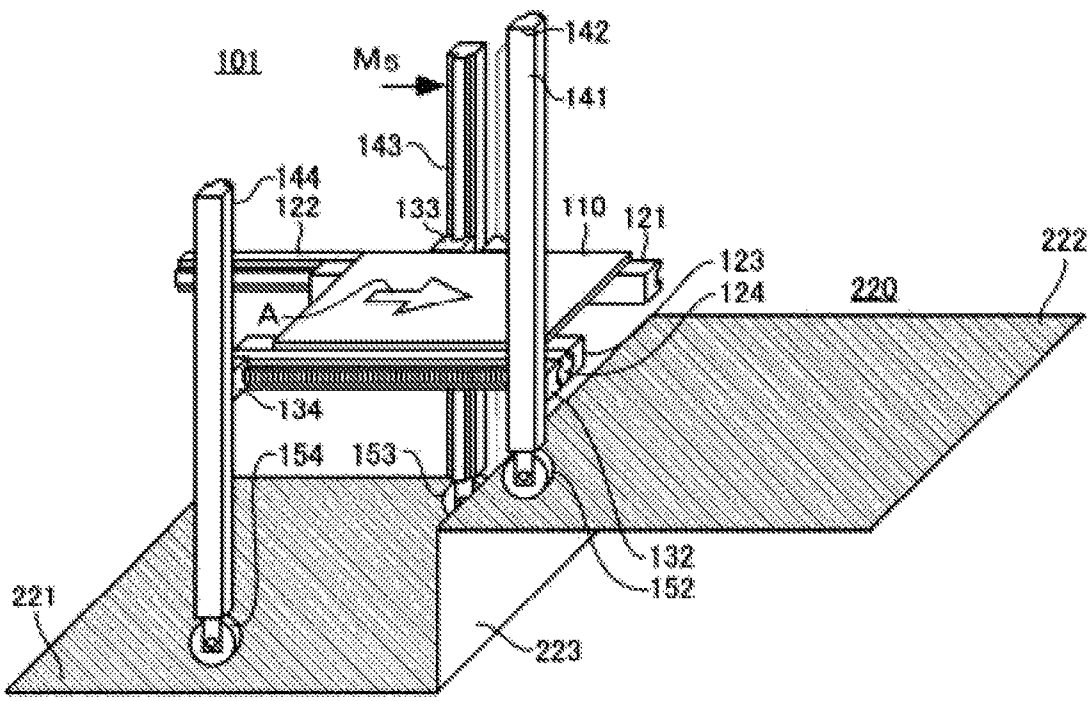
FIG. 13 illustrates a schematic perspective view describing an operation of the transportation device 101 to move past a step.

FIG. 13 is a drawing describing the next stage in the step-up operation of the transportation device 101. Moreover, FIG. 14 is a schematic plan view shown from a perspective looking down on the transportation device 101 in the same state as FIG. 13.

The control part 160 next operates the movable unit 133 of the rear-left leg part 143 to move the leg part 143 left behind in the moving direction A to the position adjacent to the leg part 141 along the movable rail 122, as shown by an arrow $M_5$ in the drawing. Whereby, the bed 110 is supported at three points, as shown by the triangle F in FIG. 14, by the pair of leg parts 142, 144 positioned near both ends of the movable rail 124 on the right side of the bed 110 and the pair of leg parts 141, 143 adjacent at the center as for the moving direction A on the left side of the bed 110.

Figure 14:
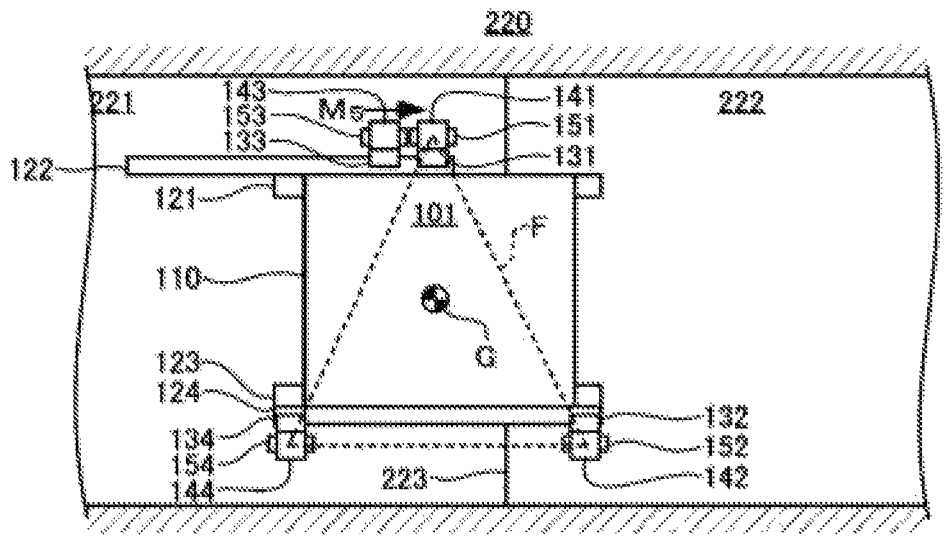
FIG. 14 illustrates a schematic plan view describing an operation of the transportation device 101 to move past a step.

Note that, in the transportation device 101 in the state as shown in FIG. 13 and FIG. 14, the leg parts 141, 143 on the left side of the bed 110 are adjacent to each other. Thus, the bed 110 is supported by three leg parts 141, 142, 144 arranged so as to form the triangle F, and the position of the center of gravity G of the bed 110 hardly changes. As such, the support of the bed 110 by the leg parts 141, 142, 143, 144 is stable.

Figure 15:
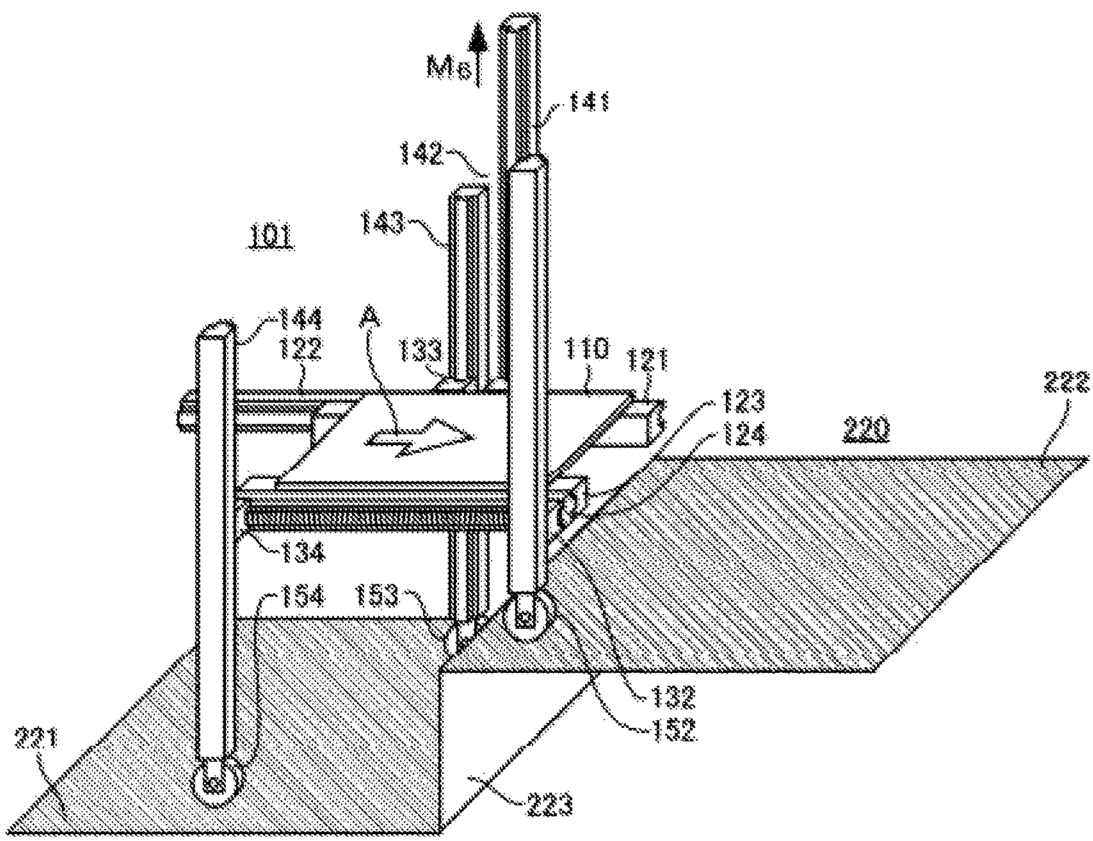
FIG. 15 illustrates a schematic perspective view describing an operation of the transportation device 101 to move past a step.

FIG. 15 is a drawing describing the next stage in the step-up operation of the transportation device 101. Moreover, FIG. 16 is a schematic plan view shown from a perspective looking down on the transportation device 101 in the same state as FIG. 15.

The control part 160 next operates the front-left movable unit 131 to raise the front-left leg part 141, as shown by an arrow $M_6$ in the drawing. Whereby, the traveling unit 151 of the leg part 141 changes its relative position in the vertical direction with respect to the bed 110 until it reaches a level at least higher than the floor surface of the upper step 222 of the route 220.

Figure 16:
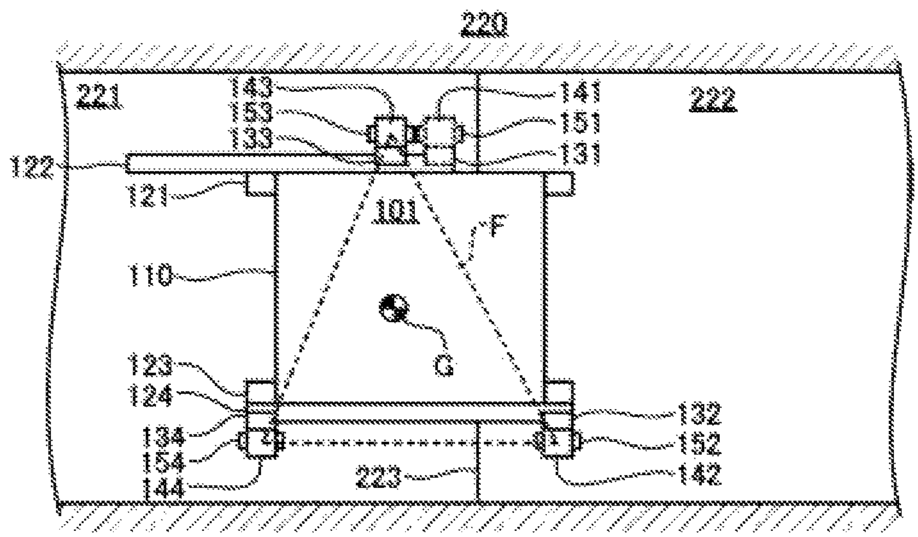
FIG. 16 illustrates a schematic plan view describing an operation of the transportation device 101 to move past a step.

Note that, as shown in FIG. 16, the leg parts 141, 143 are positioned adjacent on the left side of the bed 110. Thus, even when the leg part 141 is raised and no longer supports the bed 110, the bed 110 is supported by three leg parts 142, 143, 144. Thus, the center of gravity G of the bed 110 is located near the center of the triangle F made by the leg parts 142, 143, 144 as apexes, and their support of the bed 110 is stable.

Figure 17:
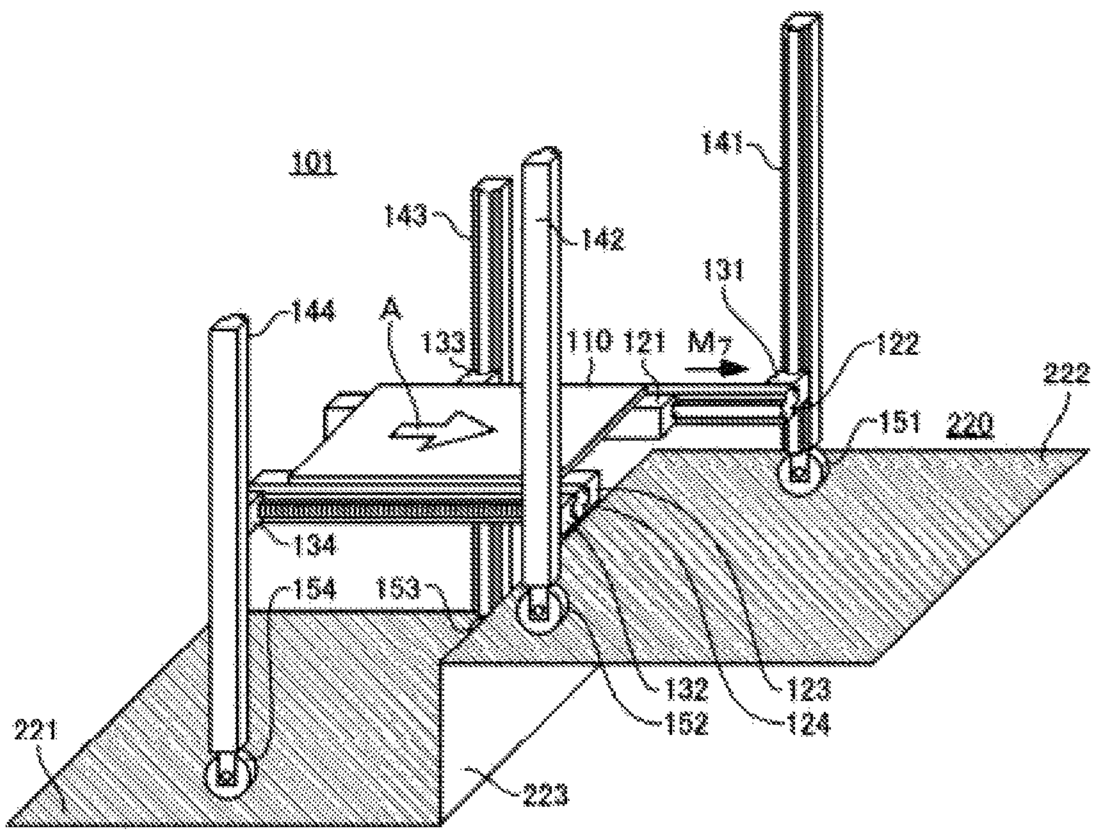
FIG. 17 illustrates a schematic perspective view describing an operation of the transportation device 101 to move past a step.
Figure 18:
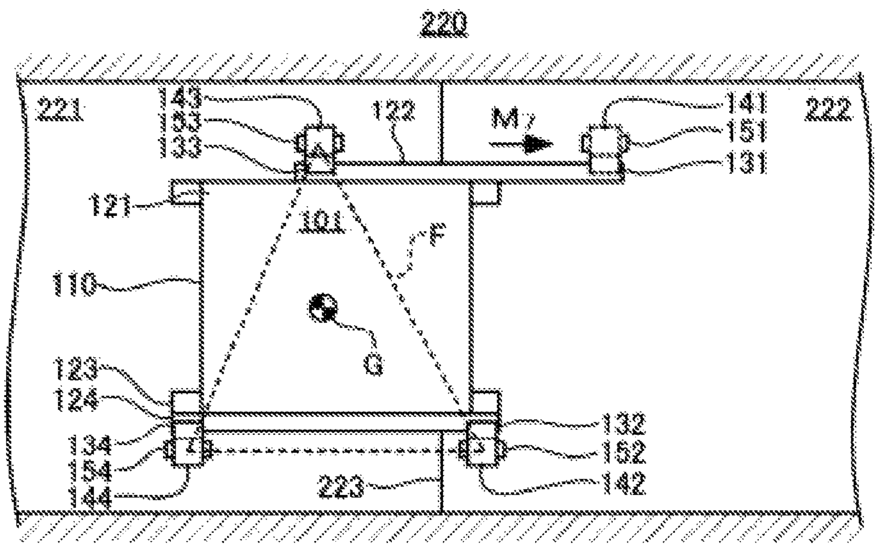
FIG. 18 illustrates a schematic plan view describing an operation of the transportation device 101 to move past a step.

FIG. 17 is a drawing describing the next stage in the step-up operation of the transportation device 101. Moreover, FIG. 18 is a schematic plan view shown from a perspective looking down on the transportation device 101 in the same state as FIG. 17.

The control part 160 next operates the driving part, which moves the movable rail 122 with respect to the fixed rail 121, to move the movable rail 122 coupled to the leg part 141 via the movable unit 131 forward in the moving direction A, as shown by an arrow $M_7$ in the drawing. Moreover, while the movable rail 122 is moving forward, the control part 160 operates the movable unit 133 at the same speed in the opposite direction to the movable unit 131. Whereby, even when the movable rail 122 moves forward, the rear-left leg part 143 continues staying at the central position of the bed 110 as for the moving direction A.

With a series of these operations, the movable rail 122 moves forward until its rear end reaches the position of the leg part 143. At this time, the front end of the movable rail 122 moves while holding the leg part 141, to move the leg part 141 to the position where, on the upper step 222 of the step 223, it extends forward beyond the front-right leg part 142 and beyond the bed 110.

Note that, in the operation described above, the control part 160 may perform control to hold the traveling unit 151 higher than the floor surface of the upper step 222 until the leg part 141 climbs over the step 223, and then ground the traveling unit 151 on the floor surface of the upper step 222 after the leg part 141 comes to above the upper step 222. Whereby, it can obviate an accident of the traveling unit 151 contacting the step 223 during the course of forward movement of the leg part 141, for example.

Figure 19:
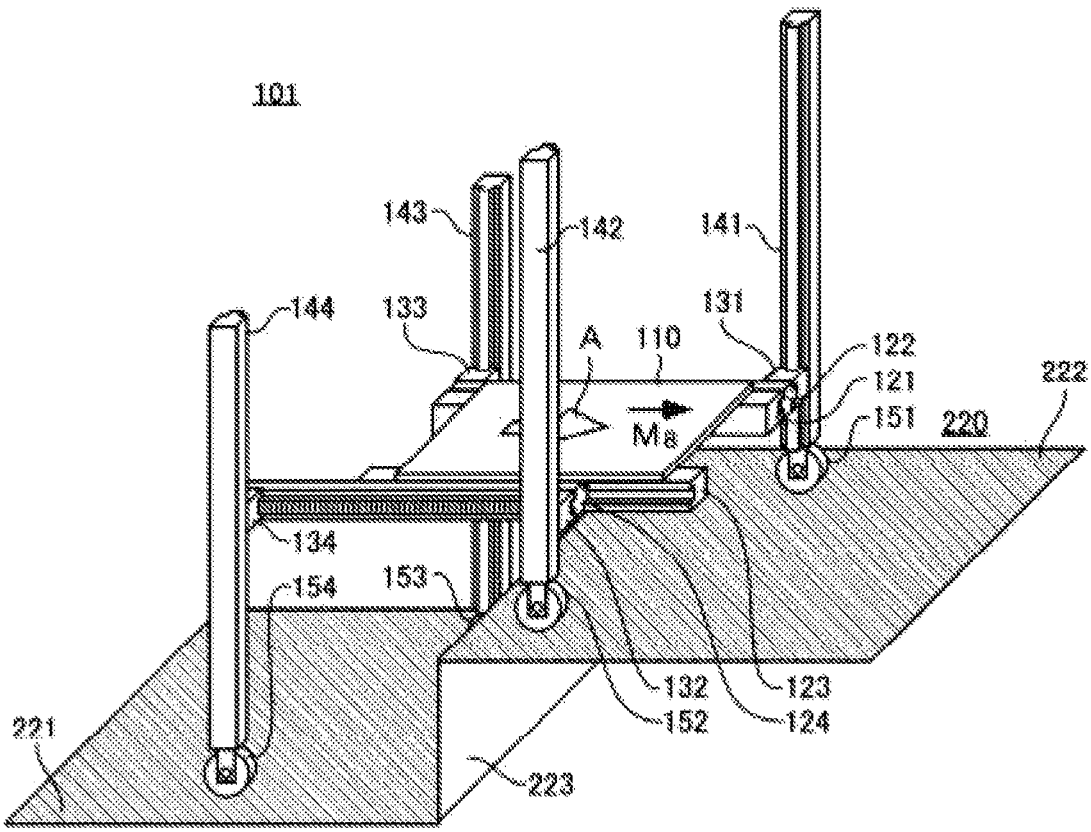
FIG. 19 illustrates a schematic perspective view describing an operation of the transportation device 101 to move past a step.
Figure 20:
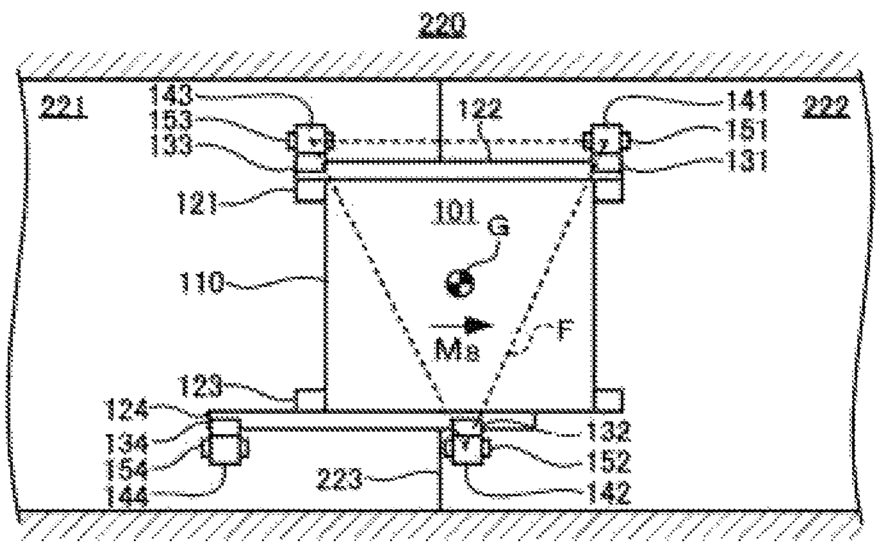
FIG. 20 illustrates a schematic plan view describing an operation of the transportation device 101 to move past a step.

FIG. 19 is a drawing describing the next stage in the step-up operation of the transportation device 101. Moreover, FIG. 20 is a schematic plan view shown from a perspective looking down on the transportation device 101 in the same state as FIG. 19.

The control part 160 next operates the driving part that moves the movable rail 122 with respect to the fixed rail 121 and the driving part that moves the movable rail 124 with respect to the fixed rail 123 simultaneously at the same speed, thereby moving the bed 110 supported by the fixed rails 121, 123 forward in the moving direction A, as shown by an arrow $M_8$ in the drawing. The bed 110 thus forwarded moves to near the front end of the movable rail 122 projected forward.

In this manner, by the position of the bed 110 having moved forward, the load by the bed 110 is applied on three leg parts 141, 142, 143 located at the front side of the transportation device 101. Moreover, the rear-right leg part 144 located at the rearmost is released from its role to support the bed 110. However, as shown in FIG. 20, the bed 110 is still supported by three leg parts 141, 142, 143, and the position of the center of gravity G of the bed 110 hardly moves from the approximate center of the bed 110. Thus, the support of the bed 110 is stable. In this manner, the control part 160 can move the center of gravity of the entire transportation device 101 by relatively moving the bed 110 with respect to the leg parts 141, 142, 143, 144, in a way, to switch the combinations of three leg parts to support the bed 110 among four leg parts 141, 142, 143, 144.

Figure 21:
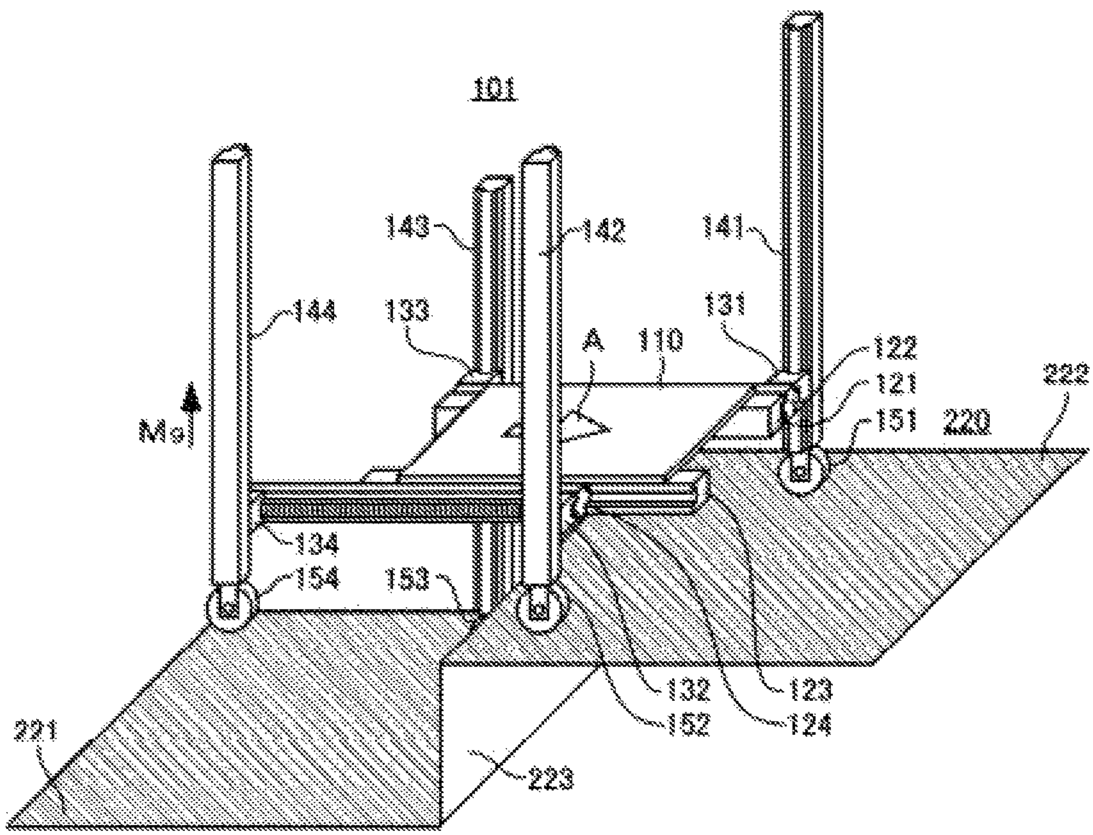
FIG. 21 illustrates a schematic perspective view describing an operation of the transportation device 101 to move past a step.
Figure 22:
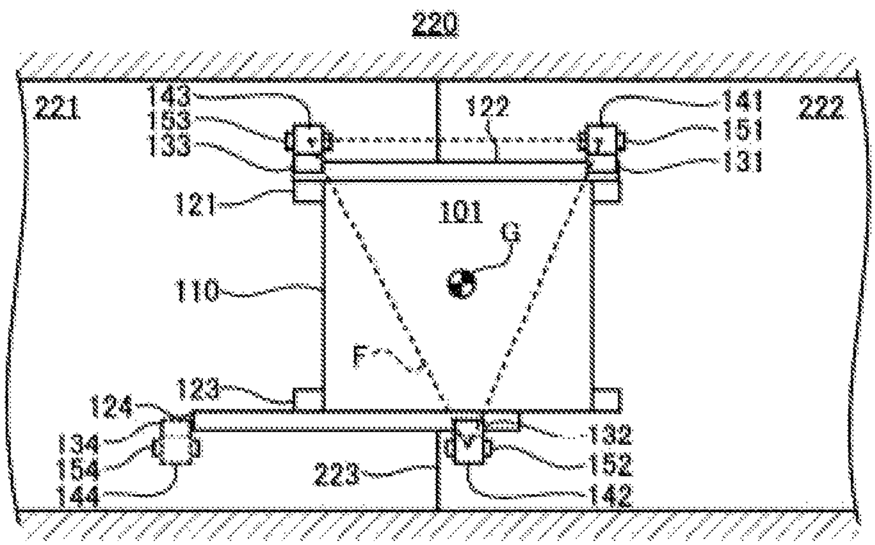
FIG. 22 illustrates a schematic plan view describing an operation of the transportation device 101 to move past a step.

FIG. 21 is a drawing describing the next stage in the step-up operation of the transportation device 101. Moreover, FIG. 22 is a schematic plan view shown from a perspective looking down on the transportation device 101 in the same state as FIG. 21.

The control part 160 next operates the rear-right movable unit 134 to raise the rear-right leg part 144, as shown by an arrow $M_9$ in the drawing. Whereby, the traveling unit 154 of the leg part 144 changes its relative position in the vertical direction with respect to the bed 110 until it reaches a level higher than the step 223.

Note that, as shown in FIG. 21, the bed 110 is supported by three leg parts 141, 142, 143 when the bed 110 moves forward. As such, even when the leg part 144 is raised and no longer supports the bed 110, the center of gravity G of the bed 110 is located near the center inside the triangle F made by three leg parts 141, 142, 143 as apexes, and the support of the bed 110 is stable.

Figure 23:
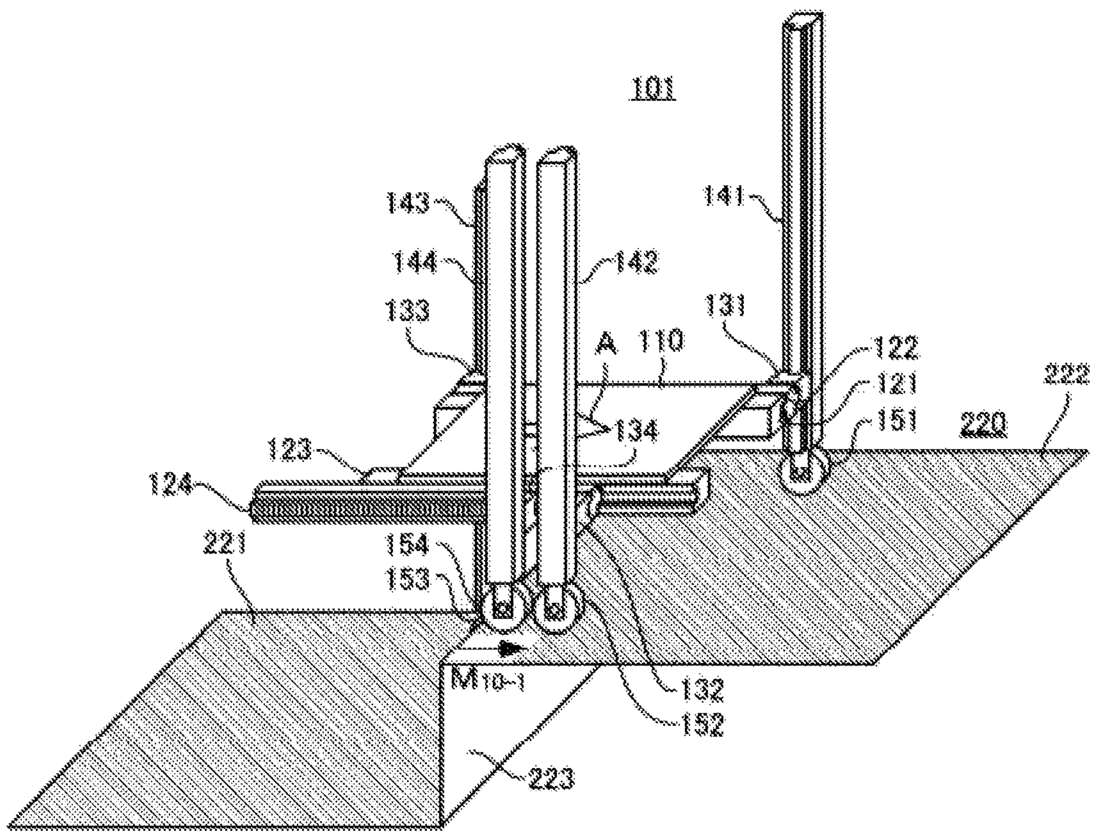
FIG. 23 illustrates a schematic perspective view describing an operation of the transportation device 101 to move past a step.
Figure 24:
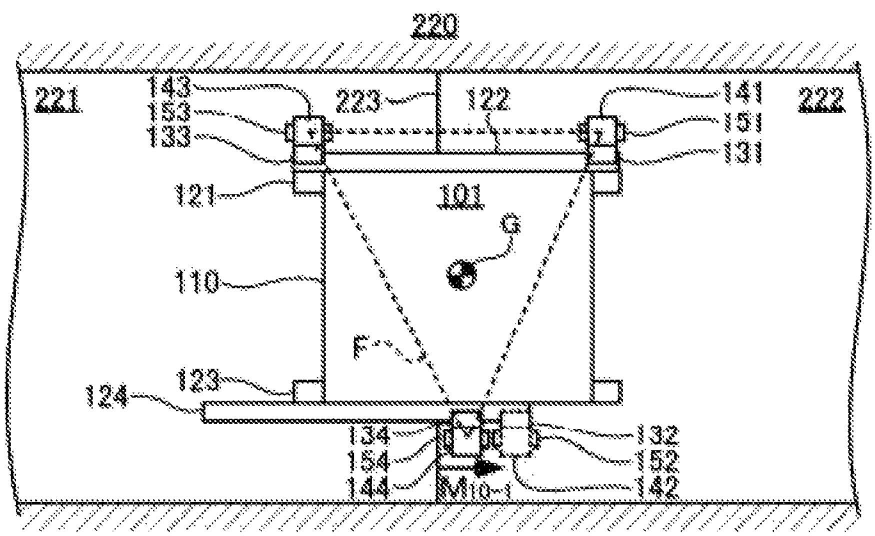
FIG. 24 illustrates a schematic plan view describing an operation of the transportation device 101 to move past a step.

FIG. 23 is a drawing describing the next stage in the step-up operation of the transportation device 101. Moreover, FIG. 24 is a schematic plan view shown from a perspective looking down on the transportation device 101 in the same state as FIG. 23.

The control part 160 next operates the rear-right movable unit 134 to move the rear-right leg part 144 forward in the moving direction A, as shown by an arrow $M_{10-1}$ in the drawing. Whereby, the traveling unit 154 of the leg part 144 moves to near the center of the bed 110 to be adjacent to the front-right leg part 142 while moving to above the upper step 222 of the step 223. Therefore, by landing the rear-right leg part 144 on the upper step 222, the front-right leg part 142 can be released from supporting the bed 110.

Figure 25:
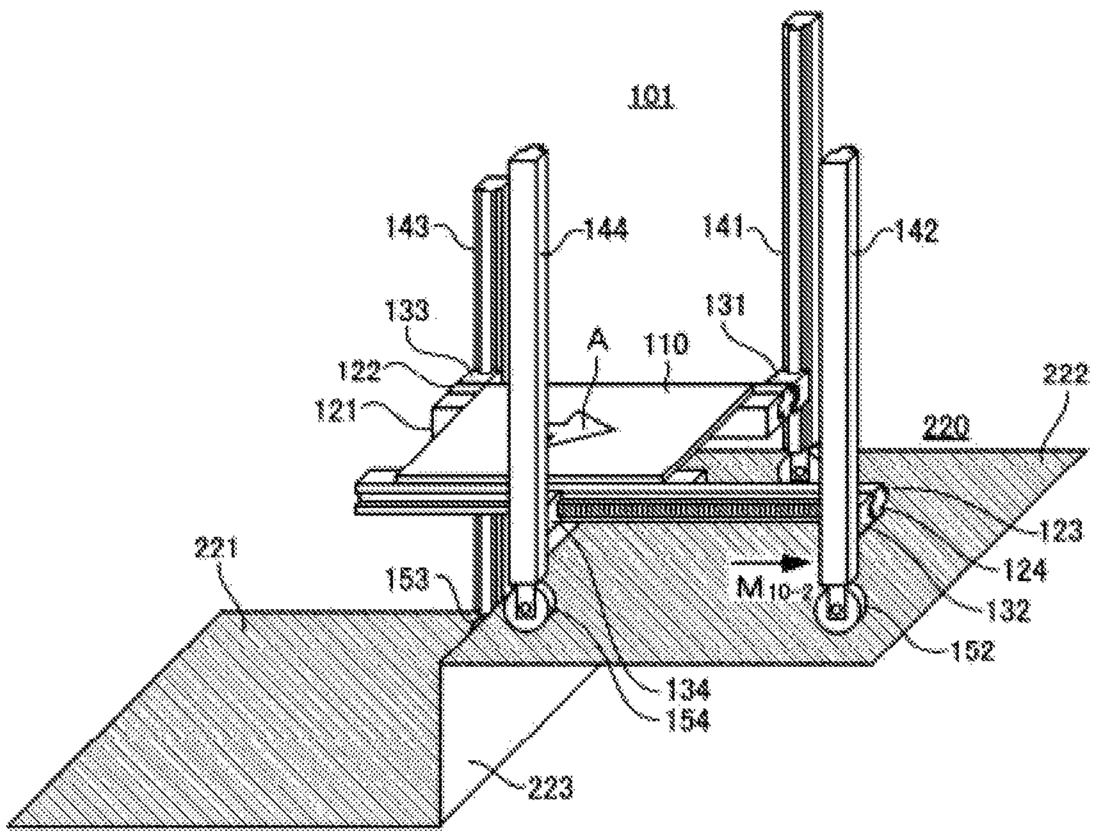
FIG. 25 illustrates a schematic perspective view describing an operation of the transportation device 101 to move past a step.
Figure 26:
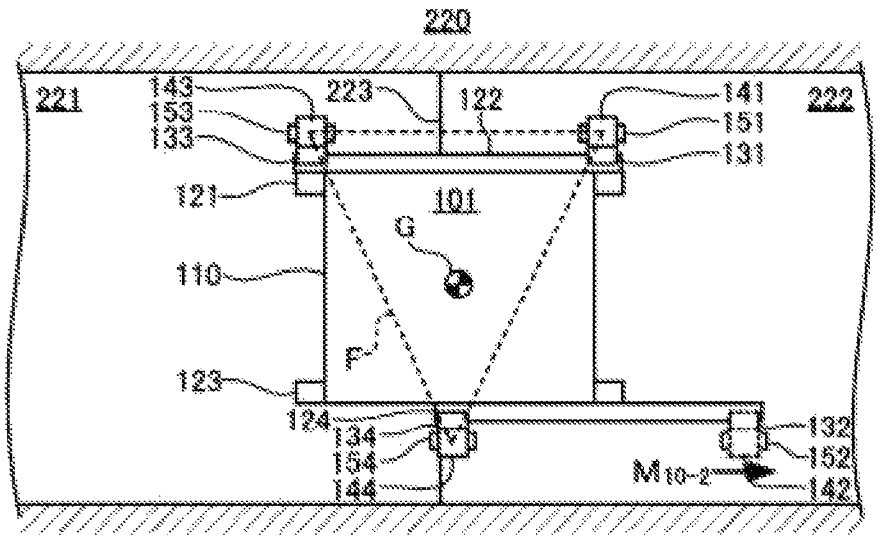
FIG. 26 illustrates a schematic plan view describing an operation of the transportation device 101 to move past a step.

FIG. 25 is a drawing describing the next stage in the step-up operation of the transportation device 101. Moreover, FIG. 26 is a schematic plan view shown from a perspective looking down on the transportation device 101 in the same state as FIG. 25.

The control part 160 next moves forward the movable rail 124 coupled to the leg part 142 via the movable unit 132 in the moving direction A, as shown by an arrow $M_{10-2}$ in the drawing. Moreover, while the movable rail 124 is moving forward, the control part 160 operates the movable unit 134 at the same speed in the opposite direction to the movable unit 132. Whereby, even when the movable rail 124 moves forward, the rear-right leg part 144 continues staying at the central position of the bed 110 as for the moving direction A.

With a series of these operations, the movable rail 124 moves forward until its rear end reaches the position of the leg part 144. At this time, the front end of the movable rail 124 moves to the position where it extends forward beyond the bed 110 while holding the leg part 142, thereby moving the leg part 142 to above the upper step 222 of the route 220 and then landing the front-right traveling unit 152 on the floor surface of the upper step 222.

Figure 27:
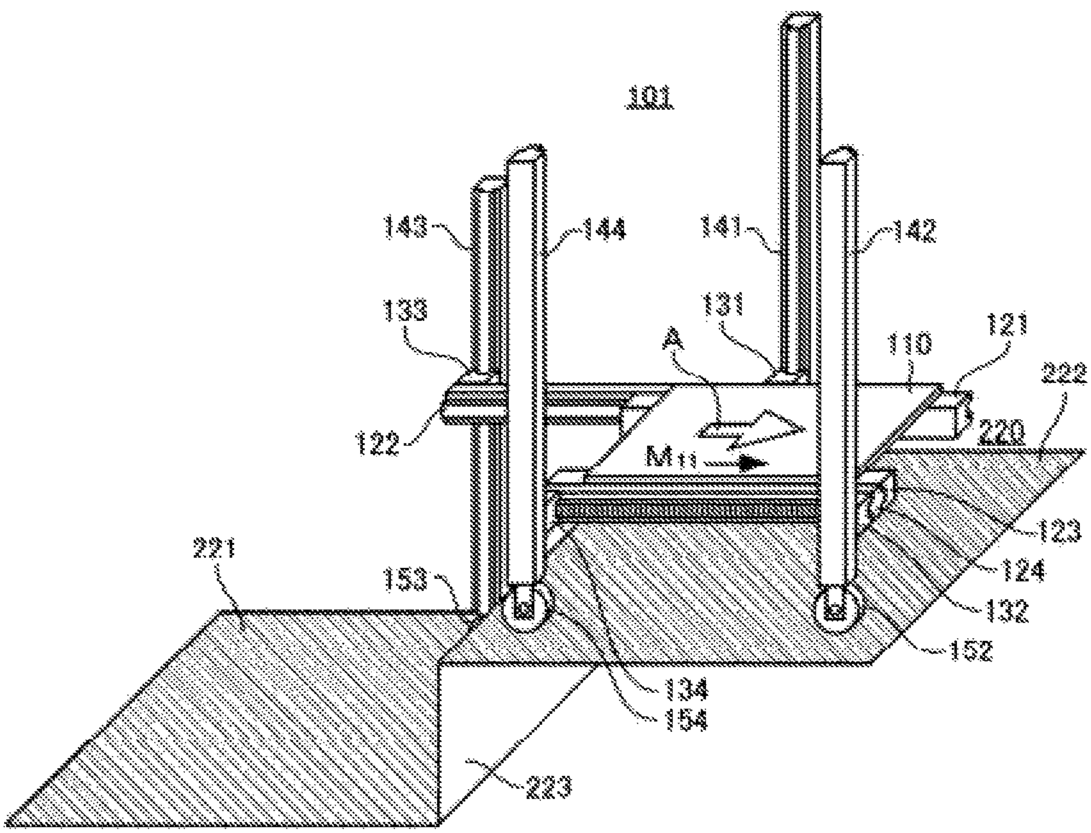
FIG. 27 illustrates a schematic perspective view describing an operation of the transportation device 101 to move past a step.

FIG. 27 is a drawing describing the next stage in the step-up operation of the transportation device 101. Moreover, FIG. 28 is a schematic plan view shown from a perspective looking down on the transportation device 101 in the same state as FIG. 27.

The control part 160 next operates the driving part that moves the movable rail 122 with respect to the fixed rail 121 and the driving part that moves the movable rail 124 with respect to the fixed rail 123 simultaneously at the same speed, thereby moving the bed 110 supported by the fixed rails 121, 123 forward in the moving direction A, as shown by an arrow $M_{11}$ in the drawing. The bed 110 thus forwarded moves to near the front end of the movable rail 122 projected forward to hold the leg part 142.

In this manner, by the position of the bed 110 having moved forward, the load by the bed 110 is applied on three leg parts 141, 142, 144 located at the front side of the transportation device 101. Moreover, the rear-right leg part 143 located at the rearmost is released from its role to support the bed 110.

Figure 28:
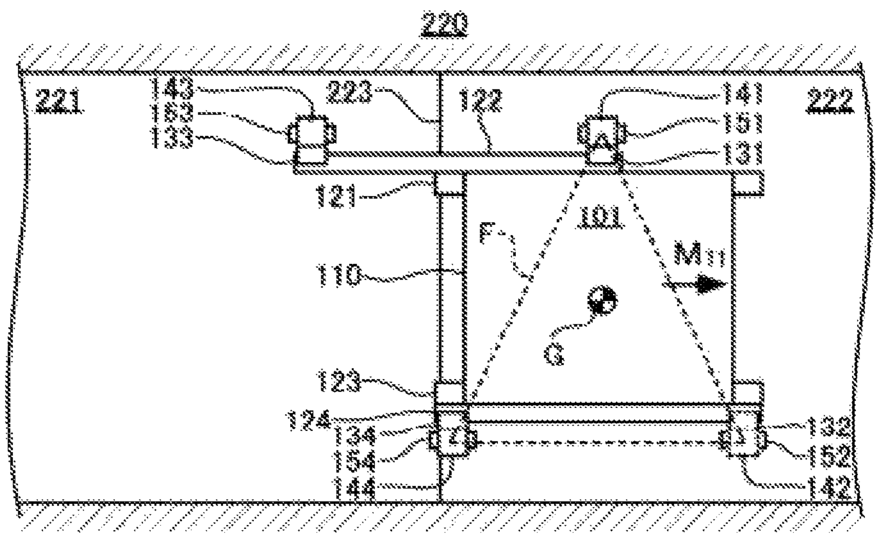
FIG. 28 illustrates a schematic plan view describing an operation of the transportation device 101 to move past a step.

However, as shown in FIG. 28, the bed 110 is still supported by three leg parts 141, 142, 144, and the position of the center of gravity G of the bed 110 hardly moves from the approximate center of the triangle formed by the leg parts 141, 142, 144 in the plan view. Thus, the support of the bed 110 is stable. In this manner, the control part 160 can move the center of gravity of the entire transportation device 101 by relatively moving the bed 110 with respect to the leg parts 141, 142, 143, 144, in a way, to switch the combinations of three leg parts to support the bed 110 among four leg parts 141, 142, 143, 144.

Figure 29:
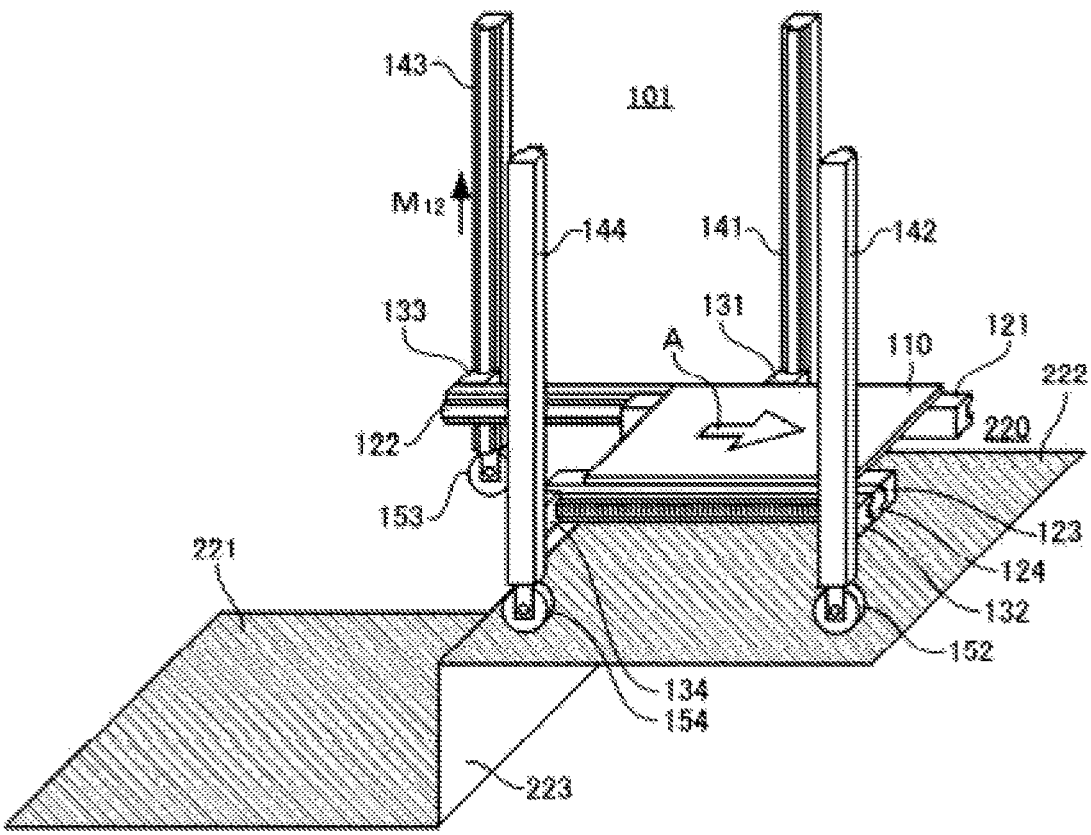
FIG. 29 illustrates a schematic perspective view describing an operation of the transportation device 101 to move past a step.
Figure 30:
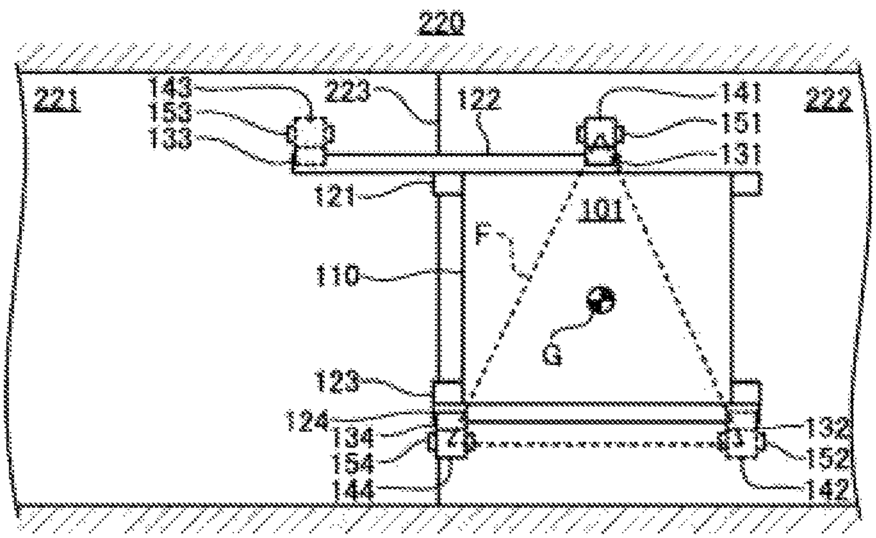
FIG. 30 illustrates a schematic plan view describing an operation of the transportation device 101 to move past a step.

FIG. 29 is a drawing describing the next stage in the step-up operation of the transportation device 101. Moreover, FIG. 30 is a schematic plan view shown from a perspective looking down on the transportation device 101 in the same state as FIG. 29.

The control part 160 next operates the rear-left movable unit 133 to raise the rear-left leg part 143, as shown in an arrow $M_{12}$ in the drawing. Whereby, the traveling unit 153 of the leg part 143 changes its relative position in the vertical direction with respect to the bed 110 until it reaches a level higher than the floor surface of the upper step 222 of the step 223.

Note that, as shown in FIG. 28, the bed 110 is supported by three leg parts 141, 142, 144 when the bed 110 moves forward. As such, even when the leg part 143 is raised and no longer supports the bed 110, the center of gravity G of the bed 110 is located near the center of the triangle made by three leg parts 141, 142, 144 as apexes, and the support of the bed 110 is stable.

Figure 31:
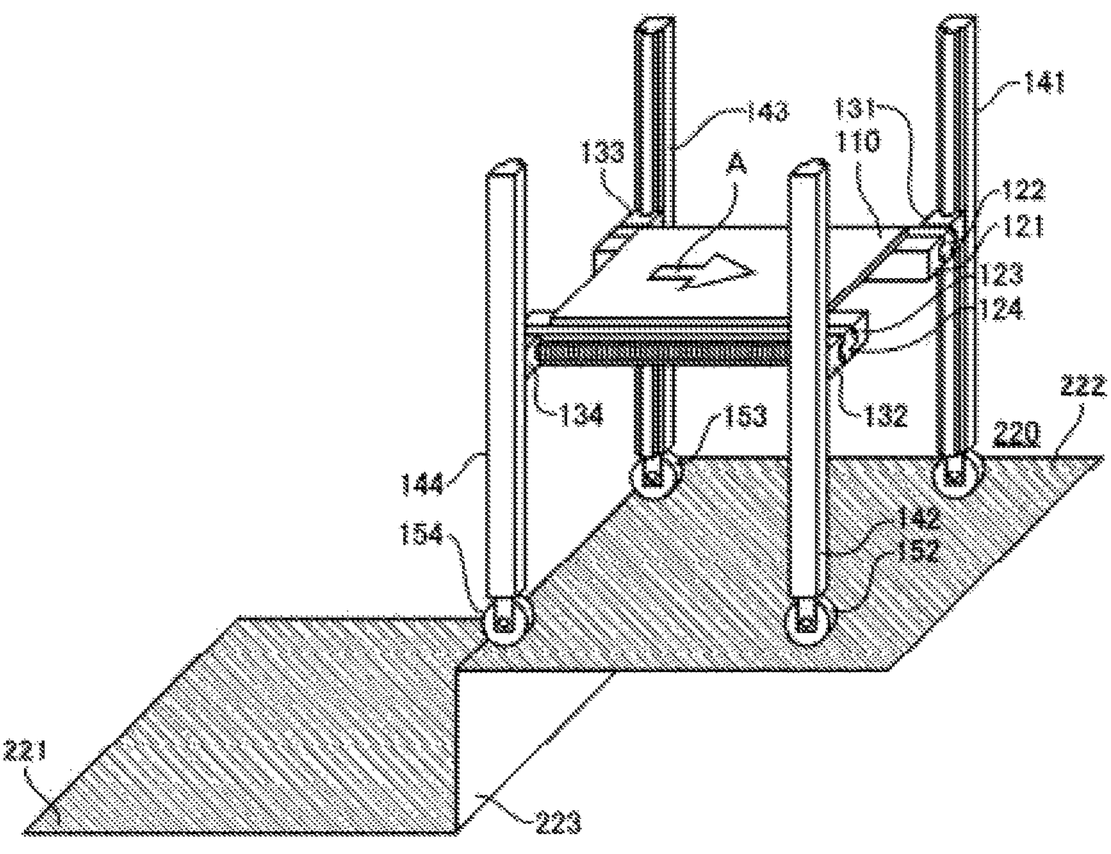
FIG. 31 illustrates a schematic perspective view describing an operation of the transportation device 101 to move past a step.
Figure 32:
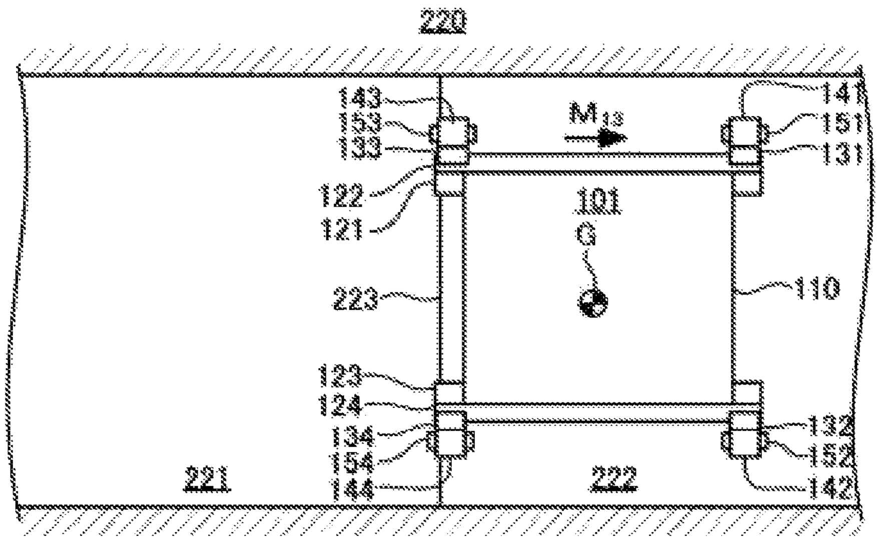
FIG. 32 illustrates a schematic plan view describing an operation of the transportation device 101 to move past a step.

FIG. 31 is a drawing describing the next stage in the step-up operation of the transportation device 101. Moreover, FIG. 32 is a schematic plan view shown from a perspective looking down on the transportation device 101 in the same state as FIG. 31.

The control part 160 next moves forward the movable rail 122 with respect to the fixed rail 121 on the right side in the moving direction A, as shown by an arrow $M_{13}$ in the drawing. At this time, the pair of leg parts 141, 143 held on both ends of the movable rail 122 also moves forward along with the movable rail 122 in the moving direction A. Here, the movable rail 122 moves until its front end reaches the position of the front end of the other movable rail 124. In this manner, the transportation device 101 completes the step-up operation to the upper step 222 of the step 223 while supporting the bed 110 by four leg parts 141, 142, 143, 144 as shown in FIG. 1 and FIG. 3.

Note that, also in the operation described above, the control part 160 may control to hold the traveling unit 153 higher than the floor surface of the upper step 222 until the leg part 143 climbs over the step 223, and then ground the traveling unit 153 on the floor surface of the upper step 222 after the leg part 143 comes to above the upper step 222. Whereby, it can obviate an accident of the traveling unit 153 contacting the step 223 during the course of forward movement of the leg part 143, for example.

Moreover, while the example above has described a series of operations to climb over one step 223, the control part 160 may repeat the series of step-up operations when a plurality of steps 223 continue like stairs. Moreover, for stepping up the route having a short tread size such as stairs in a house, the step-up operation can be performed across three or more steps.

Further, while the step-up operation has been described as an example, the step-down operation for the transportation device 101 to go down the steps can be performed, similarly to the step-up operation, by repeating the operations to change the relative position of any leg part 141, 142, 143, 144 released from the role to support the bed with respect to the bed 110 in the horizontal direction or vertical direction while supporting the bed 110 by three of four leg parts 141, 142, 143, 144. Moreover, the transportation device 101 can be used for transportation not only on steps but also on an inclined surface or irregular surface.

Figure 69:
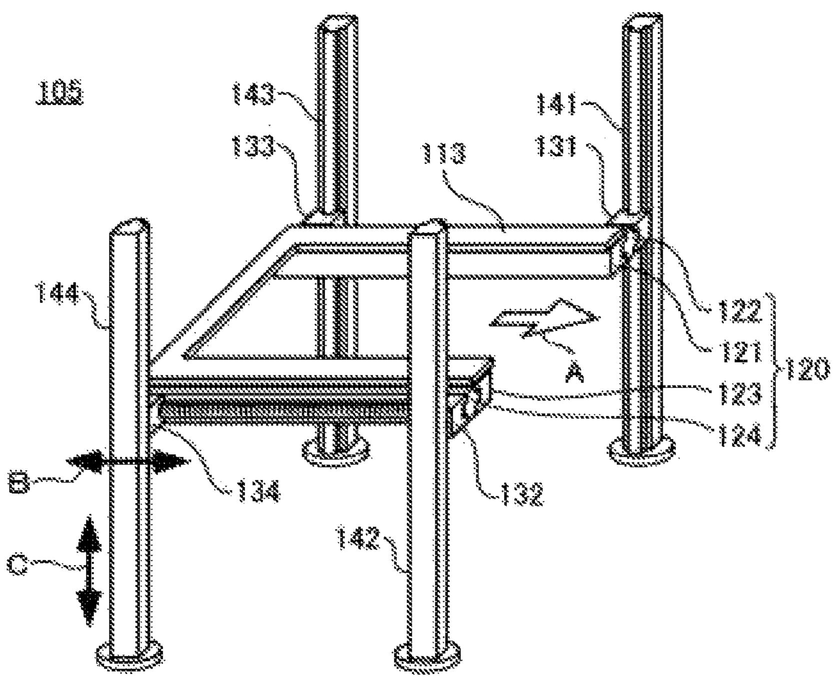
FIG. 69 illustrates a schematic perspective view of a transportation device 105 according to another embodiment.

FIG. 69 is a drawing showing a form of another transportation device 105. The transportation device 105 is different in the configuration from the transportation device 101 in that the leg parts 141, 142, 143, 144 respectively are not provided with the traveling units 151, 152, 153, 154. Moreover, it is different in the configuration from the transportation device 101 also in that the bed 113 has a shape that is open on the front side in the advancing direction A.

The series of operations described above for the transportation device 101 to climb over the step 223 can be accomplished without using the traveling units 151, 152, 153, 154. That is, by keeping three of four leg parts 141, 142, 143, 144 landed on the floor surface and raising the remaining one to separate it from the floor, the leg parts 141, 142, 143, 144 can be forwarded sequentially along the movable rails 122, 124 without using the traveling units 151, 152, 153, 154. Therefore, even the transportation device 105 shown in FIG. 69 can climb over the step 223 and move straight.

Moreover, the transportation device 105 can also move straight on the flat floor by moving the leg parts 141, 142, 143, 144 sequentially according to the operation to climb over the step 223. Further, for example, by coupling an object that can autonomously travel, such as a wheelchair, a cart, or the like, with the bed 113 of the transportation device 105, it can travel along with the transportation device 105. That is, for climbing over the step 223, the leg parts 141, 142, 143, 144 of the transportation device 105 are grounded appropriately, and for moving on a flat floor, the transportation device 105 travels on wheels of the wheelchair or the like while raising all four of the leg parts 141, 142, 143, 144.

Whereby, the feature to travel efficiently on a flat floor by the wheelchair or the like can be combined with the feature to climb over the step 223 by the transportation device 105. Moreover, a way of use is also possible to arrange the transportation device 105 on stairs or the like not provided with a lift and use it temporarily as a substitute for the lift.

As described already, the traveling units 151, 152, 153, 154 respectively provided for the leg parts 141, 142, 143, 144 can change the traveling direction individually. Therefore, the control part 160 can change the moving direction of the transportation device 101 by orienting the front or rear pair of the traveling units 151, 152 rightward or leftward to the moving direction A, for example.

However, when the route on which the transportation device 101 travels is sandwiched between sidewalls, for example, manipulation by front or rear wheels may not make a turn. Moreover, by orienting the front pair of traveling units 151, 152 and the rear pair of traveling units 153, 154 to the directions opposite to each other, a radius of rotation of the transportation device 101 can be reduced. However, such a method of turning still requires a considerably wider route than the width of the transportation device 101 itself.

Figure 33:
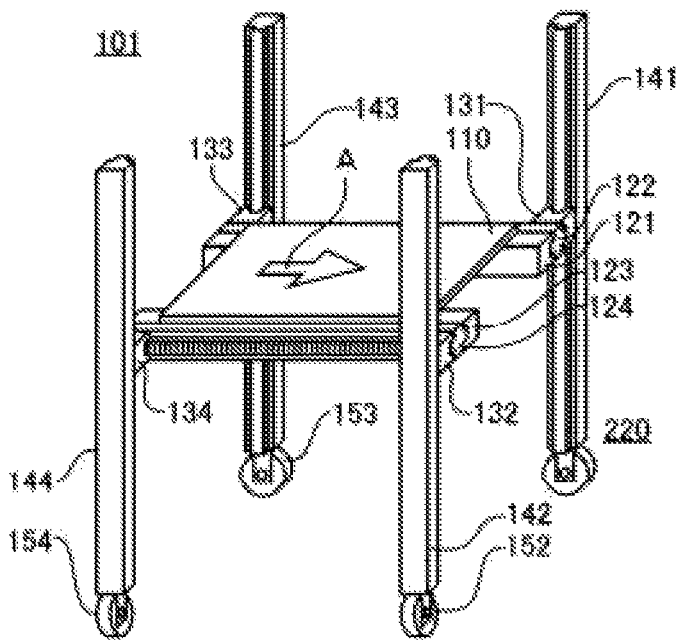
FIG. 33 illustrates a schematic perspective view showing a state of the transportation device 101 during turning.
Figure 34:
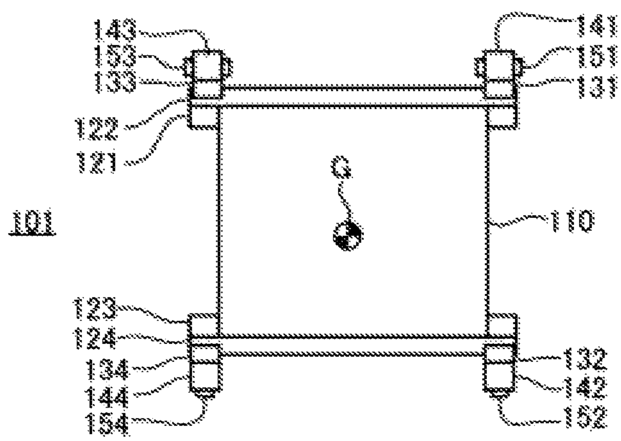
FIG. 34 illustrates a schematic plan view showing a state of the transportation device 101 during turning.

FIG. 33 is a drawing describing a turning operation when the transportation device 101 changes its moving direction. Moreover, FIG. 34 is a schematic plan view looking down on the transportation device 101 in the state as shown in FIG. 33.

For the transportation device 101 as shown, the control part 160 disposes the leg parts 141, 142, 143, 144 on the four corners of the bed 110. However, while the traveling direction of the drive wheels is set to the same direction as the moving direction A for the front and rear traveling units 151, 153 on the front-left of the transportation device 101, the traveling direction of the traveling units 152, 154 is approximately orthogonal to the moving direction A of the transportation device 101 on the right side of the transportation device 101.

Figure 35:
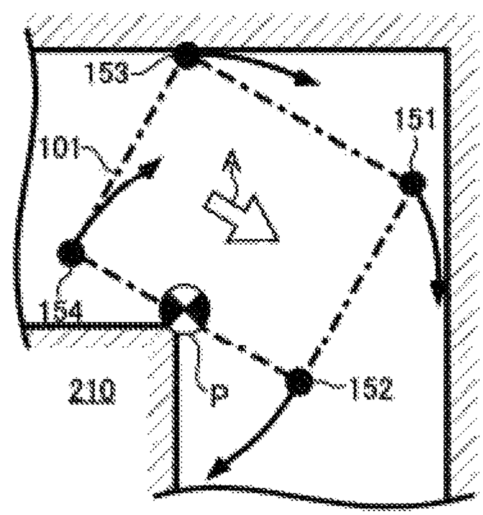
FIG. 35 illustrates a schematic plan view describing an operation of the transportation device 101 during turning.

FIG. 35 is a schematic plan view describing an operation of the transportation device 101 in the state described above to change the direction in a route 210 having a turning point. Note that, for simply displaying the drawing, the transportation device 101 is represented by a dot-dashed line denoting the bed 110 and black dots denoting the positions of the traveling units 151, 152, 153, 154.

For the transportation device 101 as shown, the control part 160 drives both the front-left and rear-left traveling units 151, 153 of the transportation device 101 in the moving direction A. Moreover, the control part 160 drives the drive wheel of the front-right traveling unit 152 of the transportation device 101 so that its traveling direction is a turning direction, while driving the drive wheel of the rear-right traveling unit 154 so that its traveling direction is opposite to the traveling direction of the front-right traveling unit 152.

The control part 160 controls each of the traveling units 151, 152, 153, 154 as described above, resulting in a pivotal turn of the transportation device 101 about the inside of the turning point of the route as a turning axis P. This can reduce a required width of the route 210 for turning the transportation device 101. However, when the turning point of the route 210 has a step as with the case of cockle stairs, for example, it is difficult to climb over the step while changing the traveling direction A in making a pivotal turn.

Figure 36:
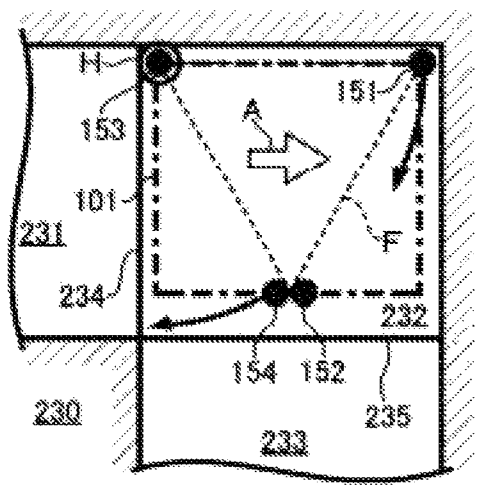
FIG. 36 illustrates a schematic plan view describing an operation of the transportation device 101 during turning.

FIG. 36 is a plan view describing a procedure of a turning operation of the transportation device 101 in a route 230 having a step and a turning point. The route 230 as shown has the same width and planar shape as those of the route 210 shown in FIG. 35. However, the route 230 has, on its turning point, ascending steps 234, 235 along the moving direction A of the transportation device 101. As such, the transportation device 101 moves sequentially along a lower step 231, a middle step 232, and an upper step 233 with different heights from each other.

For the movement of the transportation device 101 from the lower step 231 to the middle step 232 or from middle step 232 to the upper step 233, the transportation device 101 can be moved by the same procedure as that for the straight route 220 with the step 223, as already described with reference to FIG. 3 through FIG. 32. At the stage as shown, the transportation device 101 is located on the middle step 232, facing in the direction it has moved from the lower step 231. Moreover, as will be described next, the positions of the traveling units 152, 154 (leg parts 142, 144) on the right side have been changed in the turning direction.

Figure 37:
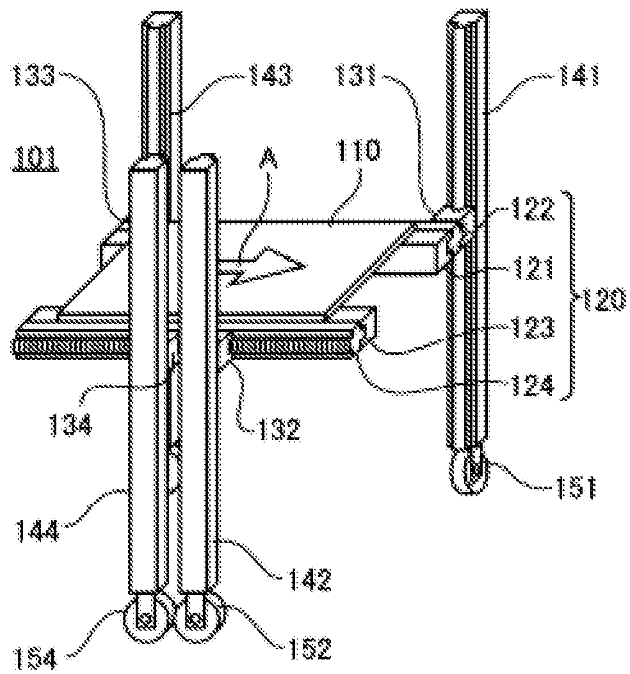
FIG. 37 illustrates a schematic perspective view showing a state of the transportation device 101 during turning.

FIG. 37 is a perspective view illustrating the transportation device 101 in the state as shown in FIG. 36. When the transportation device 101 starts turning on the middle step 232, or a so-called landing, the control part 160 moves the pair of leg parts 142, 144 along the movable rail 124 on the right side of the advancing direction A so that they are adjacent to each other at the approximate center as for the advancing direction A. Moreover, on the front-left side of the transportation device 101, the drive wheel of the traveling unit 151 rotates approximately 90 degrees about the vertical axis.

Figure 38:
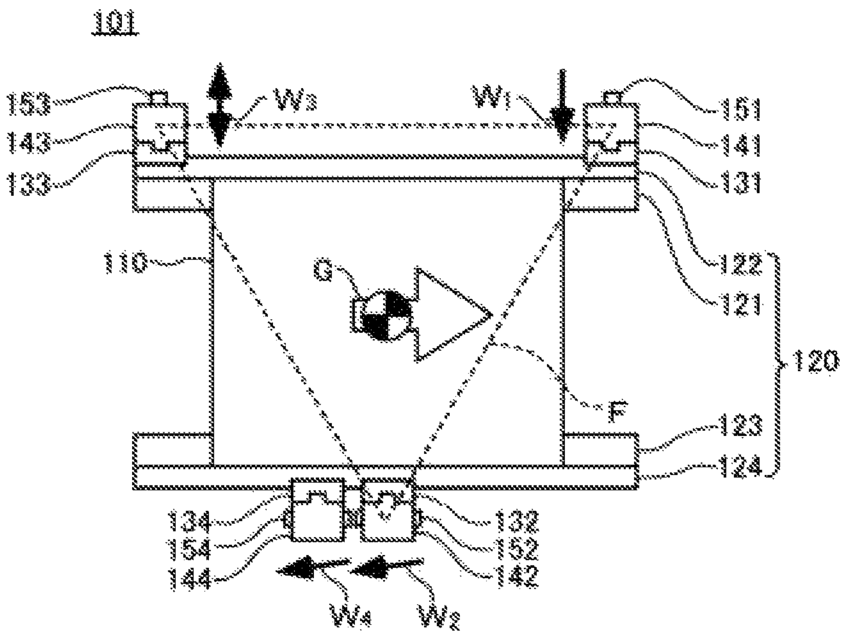
FIG. 38 illustrates a schematic plan view showing a state of the transportation device 101 during turning.

FIG. 38 is a schematic plan view of the transportation device 101 in the state as shown in FIG. 37. The transportation device 101 supports the bed 110 by the leg parts 141, 142, 143 at three points, the front and rear ends on the left side and the center of the right side, as for the advancing direction A. As shown by a dashed line F in the drawing, the center of gravity G of the bed 110 is located near the center inside the triangle made by the leg parts 141, 142, 143 as apexes, and the support of the bed 110 by the leg parts 141, 142, 143 is stable.

Moreover, as shown, for the traveling unit 151 on the left side of the transportation device 101, the orientation of the drive wheel as shown by an arrow $W_1$ is approximately orthogonal to the moving direction A. Moreover, for the traveling units 152, 154 on the right side of the transportation device 101, the orientations of the drive wheels as shown by arrows $W_2$, $W_4$ are approximately parallel to the moving direction A. Further, for the traveling unit 153, the orientation of the drive wheel as shown by an arrow $W_3$ is approximately orthogonal to a side of the triangle F connecting the leg part 141 and the leg part 142.

Here, as shown by the arrow in the drawing, the control part 160 rotationally drives at least the drive wheel of the traveling unit 151 on the front-left side in the direction in which the leg part 141 moves toward the right side of the transportation device 101. Moreover, the control part 160 rotationally drive the drive wheels of the pair of the traveling units 152, 154 on the right side in the direction in which the leg parts 142, 144 move toward rearward and slightly rightward.

Referring again to FIG. 36, for the transportation device 101 which has been transformed to the state as shown in FIG. 37 and FIG. 38, the control part 160 drives the traveling units 151, 152, 153 in the direction as described by referring to FIG. 38. Moreover, as for the traveling unit 153 shown enclosed in a circle H in the drawing, the control part 160 at least stops the rotation of the drive wheel and regulates the movement of the leg part 143 in the horizontal direction.

Whereby, the transportation device 101 fixes the leg part 143 as the turning axis to make a pivotal turn to move the side of the triangle F spanning between the leg parts 141, 142, 144 in the turning direction of the transportation device 101. This pivotal turn about the leg part 143 as the turning axis continues until the transportation device 101 turns 30 degrees.

In the operation as described above, for the traveling unit 153 of the leg part 143 serving as the turning axis, an orientation $W_3$ of the drive wheel is approximately orthogonal to the moving direction A of the leg parts 141, 142. As such, the movement of the leg part 143 serving as the turning axis is regulated stronger than a braking force for the drive wheel of the traveling unit 153.

Figure 39:
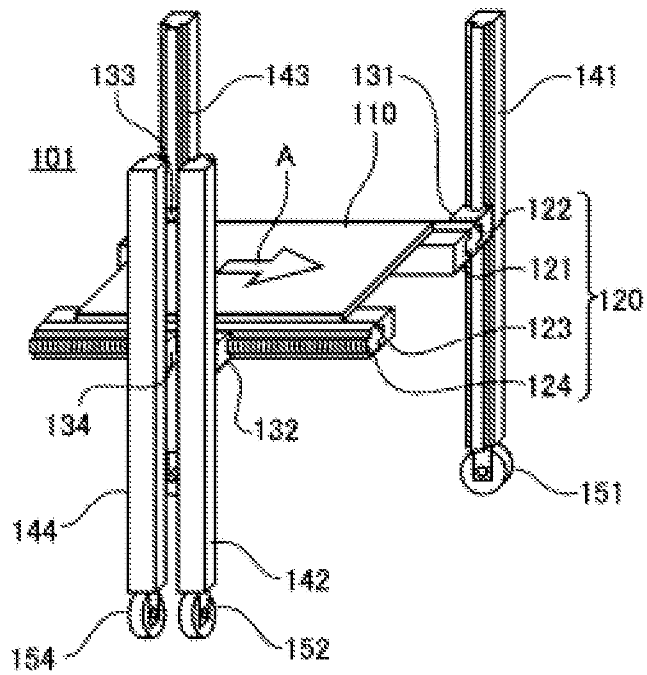
FIG. 39 illustrates a schematic perspective view showing a state of the transportation device 101 during turning.

FIG. 39 is a perspective view schematically showing the next state of the transportation device 101 which is continuing the turning operation. When the transportation device 101 completes the first pivotal turn of 30 degrees, the control part 160 changes the settings of the traveling units 151, 152, 153, 154. That is, on the left side of the transportation device 101, for the leg parts 141, 143 located on the front end and the rear end of the transportation device 101, the directions of the drive wheels of the traveling units 151, 153 are changed to the direction close to parallel to the moving direction A. Moreover, on the right side of the transportation device 101, for the pair of the leg parts 142, 144 that are adjacent to each other, the directions of the drive wheels of the traveling units 152, 154 are changed to the direction orthogonal to the moving direction A.

Figure 40:
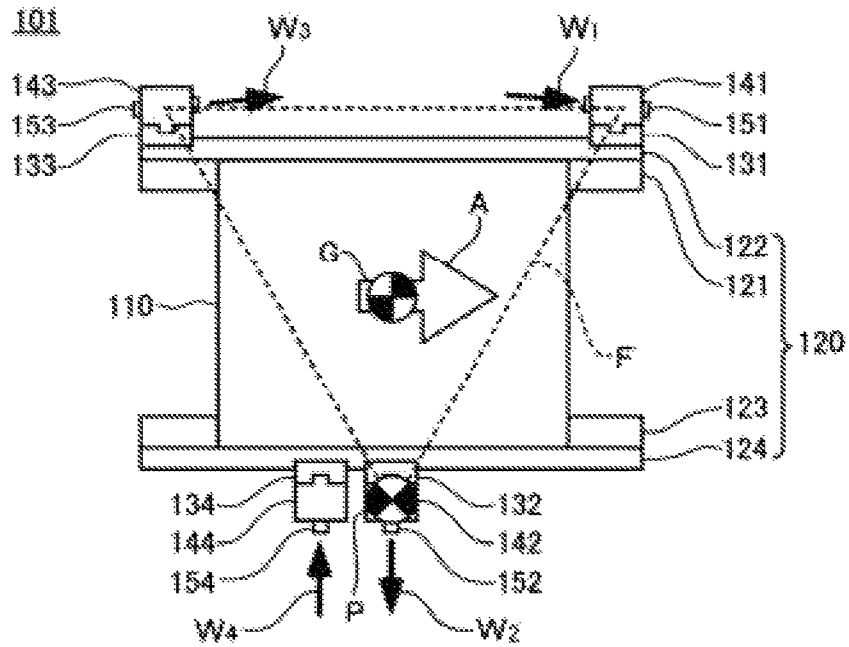
FIG. 40 illustrates a schematic plan view showing a state of the transportation device 101 during turning.

FIG. 40 is a schematic plan view of the transportation device 101 in the state as shown in FIG. 39. For the traveling units 151, 153 on the left side of the transportation device 101, as shown by the arrows $W_1$, $W_3$, the drive wheels are oriented to the direction along a circumference of a circle with the turning axis P as a center, as described below. Moreover, the drive wheels of the traveling units 151, 153 rotate in the forward direction so that the leg parts 141, 143 move forward with respect to the advancing direction A.

For the traveling units 152, 154 on the right side of the transportation device 101, the orientations of the drive wheels as shown by the arrows $W_2$, $W_4$ are orthogonal to the moving direction A. Moreover, the orientations of the drive wheels of the traveling units 152, 154 are rightward for the drive wheel of the traveling unit 152 on the front side and leftward for the drive wheel of the traveling unit 154 on the rear side.

Figure 41:
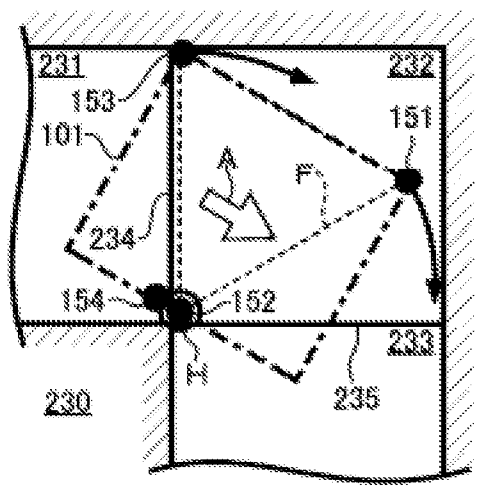
FIG. 41 illustrates a schematic plan view describing an operation of the transportation device 101 during turning.

FIG. 41 is a plan view schematically showing the operation of the transportation device 101 in the state as shown in FIG. 39 and FIG. 40. For the transportation device 101 set as described above, when the rotation of the drive wheels of the traveling units 151, 153 on the left side moves the leg parts 141, 143 in the moving direction A, the movement of the leg parts 142, 144 is regulated even when the drive wheels of the traveling units 152, 154 on the right side are not rotating at all. Thus, the control part 160 fixes the drive wheel of the traveling unit 152 enclosed in the circle H as the turning axis to make a pivotal turn of the transportation device 101 to move the side of the triangle F spanning between the leg parts 141, 143 in the turning direction of the transportation device 101. This pivotal turn continues until the transportation device 101 turns 30 degrees (see FIG. 42).

In the operation as described above, for the traveling unit 152, 154 of the leg part 142, 144 serving as the turning axis, the orientations $W_2$, $W_4$ of the drive wheels are approximately orthogonal to the traveling direction A of the traveling units 151, 153 of the leg parts 141, 143. As such, the movement of the leg parts 142, 144 serving as the turning axis is regulated strongly by a force greater than the braking force for the drive wheels of the traveling units 152, 154.

Figure 42:
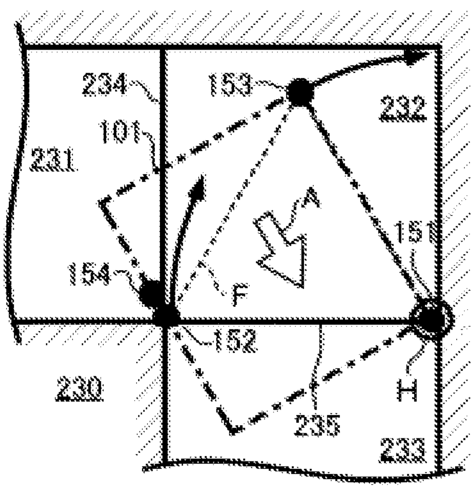
FIG. 42 illustrates a schematic plan view describing an operation of the transportation device 101 during turning.

FIG. 42 is a plan view schematically illustrating the next stage in the turning operation of the transportation device 101. In this stage, the control part 160 makes a pivotal turn of the transportation device 101 about the leg part 141 as the turning axis. As such, the rotation of the drive wheel of the traveling unit 151 of the leg part 141 enclosed in the circle H in the drawing is braked with respect to the moving direction of the leg parts 142, 143, 144 by the drive wheels of the traveling units 152, 153, 154.

Moreover, the drive wheels of the traveling units 152, 154 are oriented to the direction to move the leg parts 142, 144 diagonally left rearward and their direction of rotation is set. Moreover, the drive wheel of the traveling unit 153 is set in its orientation and direction of rotation so as to move the leg part 143 leftward with respect to the moving direction A. The transportation device 101 set as described above by the control part 160 makes a pivotal turn of the transportation device 101 about the leg part 141 as the turning axis for remaining 30 degrees (see FIG. 43).

In this manner, the control part 160 of the transportation device 101 supports the bed 110 at three points using at least three of four leg parts 141, 142, 143, 144 while, at one point, braking the movement of the leg parts 141, 142, 143, 144 by the traveling units 151, 152, 153, 154 and, at the other two points, moving the leg parts 141, 142, 143, 144 by the traveling units 151, 152, 153, 154. The pivotal turn thus produced changes the direction of the transportation device 101 in a limited area. Therefore, the transportation device 101 can travel while changing its direction even in the narrow route 210 enclosed in sidewalls or the like.

Figure 43:
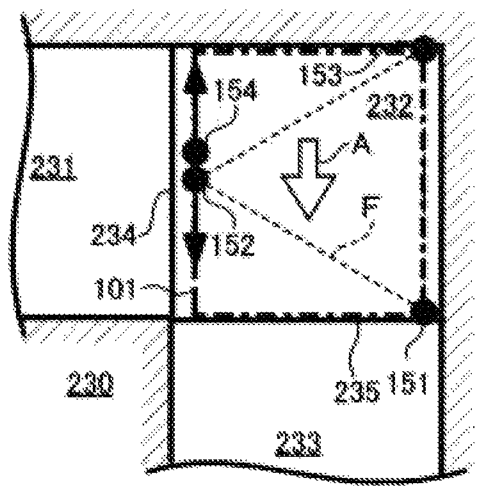
FIG. 43 illustrates a schematic plan view describing an operation of the transportation device 101 during turning.
Figure 44:
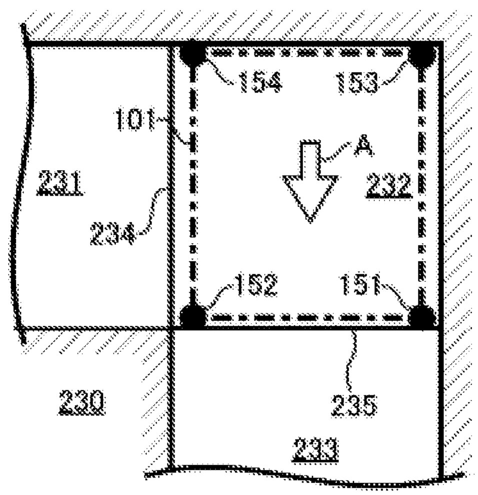
FIG. 44 illustrates a schematic plan view describing an operation of the transportation device 101 during turning.

Next, as shown in FIG. 43, the control part 160 moves the leg parts 142, 144 holding the traveling units 152, 154 on the right side of the moving direction A of the transportation device 101, along the movable rails 124 to near the both ends of the movable rails 124. In this manner, as shown in FIG. 44, the transportation device 101 completes the change in the direction of 90 degrees in the narrow route 210.

In this manner, when changing the moving direction A of the transportation device 101 in the route 230 with steps and turning points, the control part 160 makes a pivotal turn of the transportation device 101 gradually, along the triangle made by the leg parts 141, 142, 143, 144 as apexes that support the bed 110 at different three points in the horizontal direction, using the leg parts 141, 142, 143, 144 located at the apexes of the triangle above as the turning axis sequentially in a reverse order to the turning direction of the transportation device 101 including the bed 110.

This can prevent an excessive increase in the required width of the route for the transportation device 101 to turn. Moreover, by turning the inward leg parts 142, 144 as for the turning direction while they are adjacent to each other in the advancing direction A, the transportation device 101 can accomplish the change in the direction without the step-up operation to climb over the steps 234, 235 within a range of the middle step 232 serving as the landing.

Obviously, the change in the direction of the transportation device 101 is not limited to the right or 90-degree turn. Moreover, while, in the example above, the change in the direction is accomplished by three pivotal turns each by 30 degrees for a 90-degree change in the direction, an amount of turn in a single pivotal turn and the number of pivotal turns are not limited to the same amount and number of turns as those of the example above.

Note that the traveling units 151, 152, 153, 154 can change their drive directions for 360 degrees. As such, in a state where it abuts against the corner of the route 210, for example, the orientations of all the traveling units 151, 152, 153, 154 can be changed 90 degrees to move the bed 110 sideways with respect to the moving direction A without changing its direction.

However, when a person is on board the transportation device 101, traveling in the sideways brings a feeling of insecurity. Moreover, when the transportation device 101 travels sideways with respect to the moving direction A, it can be operated to climb over the step as described above. Thus, it is preferable to match the moving direction of the transportation device 101 with the moving direction A even when the route 210 is crooked.

FIG. 45 through FIG. 65 are the drawings describing a procedure of the turning operation of the transportation device 101 in a route 240 with steps and turning points. The route 240 in these drawings has the same width and planar shape as those of the route 220 shown in FIG. 36. However, the route 240 has one more step 246 at an angle of 45 degrees to other steps 245, 247 on a landing of the turning point. As such, the transportation device 101 moves sequentially along a lower step 241, a lower middle step 242, an upper middle step 243, and an upper step 244, which are ascending sequentially along the moving direction A.

Figure 45:
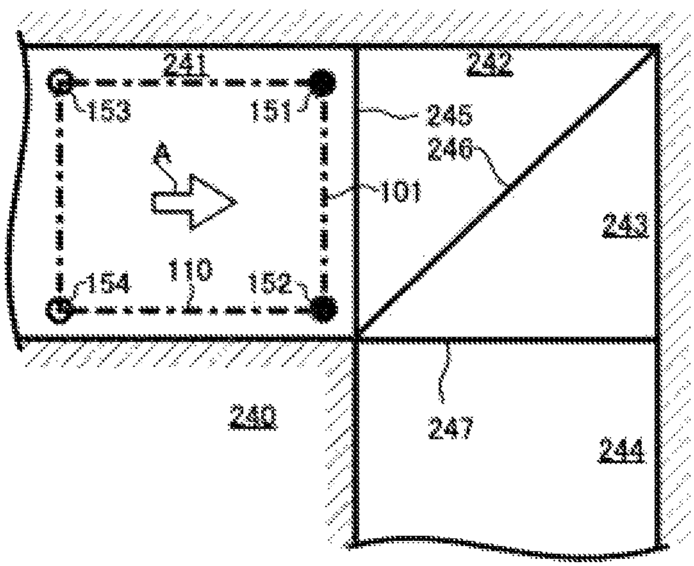
FIG. 45 illustrates a schematic plan view of the transportation device 101 that moves past a route 240.
Figure 64:
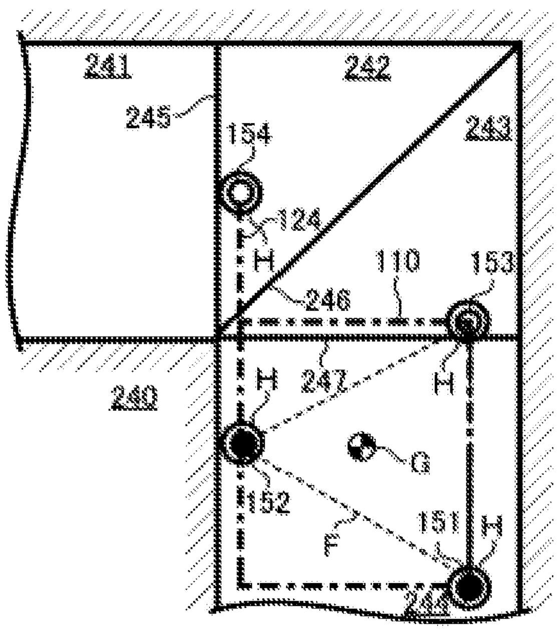
FIG. 64 illustrates a schematic plan view of the transportation device 101 that moves past the route 240.

For the movement of the transportation device 101 up to the lower step 241 of the route 240 and further from the upper step 244, the transportation device 101 can be moved by the same procedure as that for the straight route 220 with the step 223, as already described with reference to FIG. 3 through FIG. 32. Thus, the operation will be described here from the state in which the transportation device 101 has reached the lower step 241, as shown in FIG. 45, until the transportation device 101 reaches the upper step 244, as shown in FIG. 64.

Note that, in the drawings FIG. 45 through FIG. 65, white dots disposed on the sides of the rectangle indicating the bed 110 denote the rear traveling units 153, 154 in the moving direction A of the transportation device 101, while black dots similarly denote the front traveling units 151, 152 in the moving direction A, respectively. Moreover, the traveling units 151, 152, 153, 154 enclosed in the circle H in the drawings denote the unit which is braked by the drive wheel. Further, the traveling units 151, 152, 153, 154 enclosed in a square U in the drawings denote the unit of which the corresponding leg part 141, 142, 143, 144 is released from supporting the bed 110.

Figure 46:
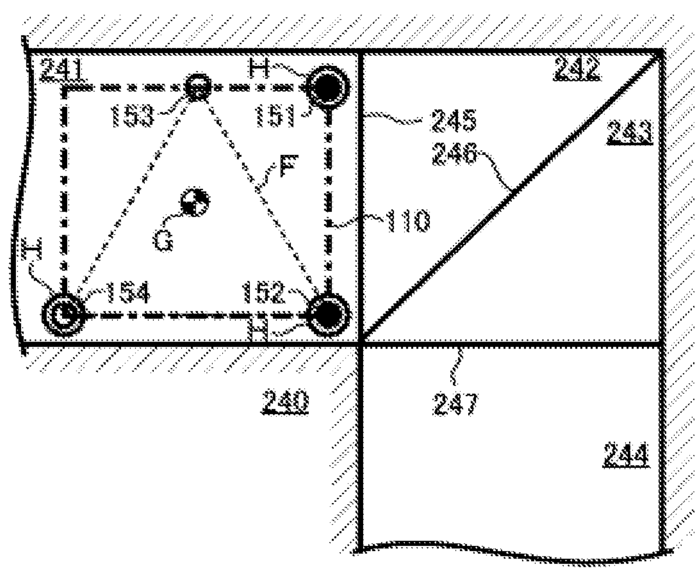
FIG. 46 illustrates a schematic plan view of the transportation device 101 that moves past the route 240.

First, as shown in FIG. 46, the control part 160 moves the left rear traveling unit 153 forward to the center of the bed 110 as for the moving direction A while braking the drive wheels of the front pair of the traveling units 151, 152 and the right rear traveling unit 154. Whereby, the center of gravity G of the bed 110 is positioned inside the triangle F formed by the leg parts 141, 143, 144, and thus the bed 110 is supported stably by three leg parts 141, 143, 144. Therefore, the front-left leg part 141 can be released from supporting the bed 110.

Figure 47:
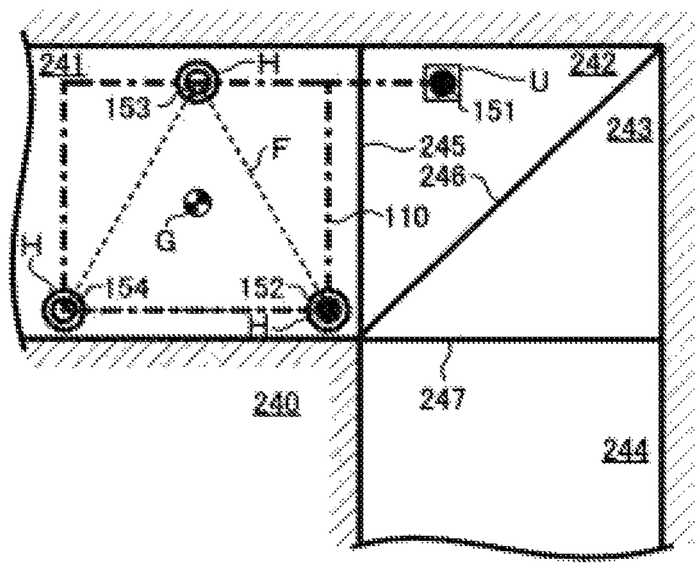
FIG. 47 illustrates a schematic plan view of the transportation device 101 that moves past the route 240.

Next, as shown in FIG. 47, the control part 160 raises the front-left leg part 141 to raise the front-left traveling unit 151. Further, the control part 160 extends the left movable rail 122 forward beyond the bed 110 to move front-left leg part 141 to above the upper middle step 243. Thereafter, the control part 160 lands the traveling unit 152 of the leg part 142 on the upper middle step 243. Whereby, the front-left leg part 141 can be ready to play a part in supporting the bed 110.

Figure 48:
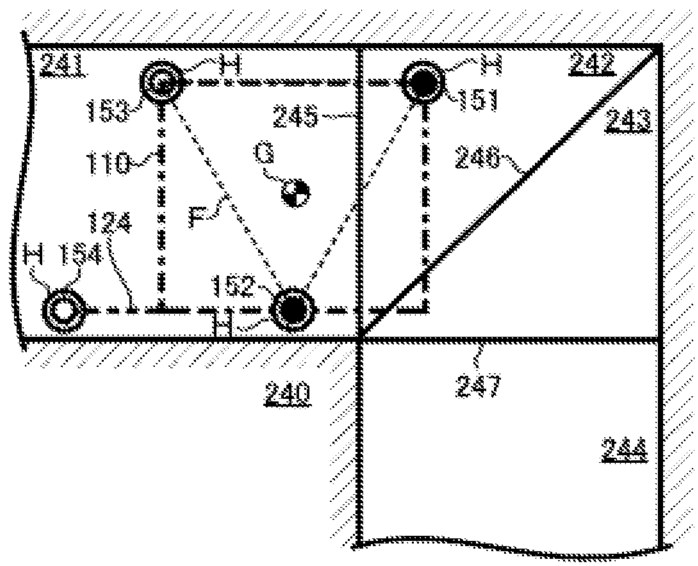
FIG. 48 illustrates a schematic plan view of the transportation device 101 that moves past the route 240.

Next, as shown in FIG. 48, the control part 160 moves the bed 110 forward with respect to the leg parts 141, 142, 143, 144 while braking the drive wheels of all the traveling units 151, 152, 153, 154. Whereby, the front end of the bed 110 comes to the lower middle step 242 and the support of the bed 110 is switched to three leg parts 141, 142, 143 located at the front side. At this time, the center of gravity G of the bed 110 is located near the center inside the triangle F made by the leg parts 141, 142, 143 as apexes, and their support of the bed 110 is stable.

Note that, in the state as shown in FIG. 48, the front-right corner of the bed 110 is beyond the step 246 reaching to the upper middle step 243. Thus, the control part 160 raises the bed 110 to the higher position than the floor surface of the upper middle step 243 at the leg parts 142, 143, 144 located rearward as well so that the bed 110 does not abut against the step 246.

Figure 49:
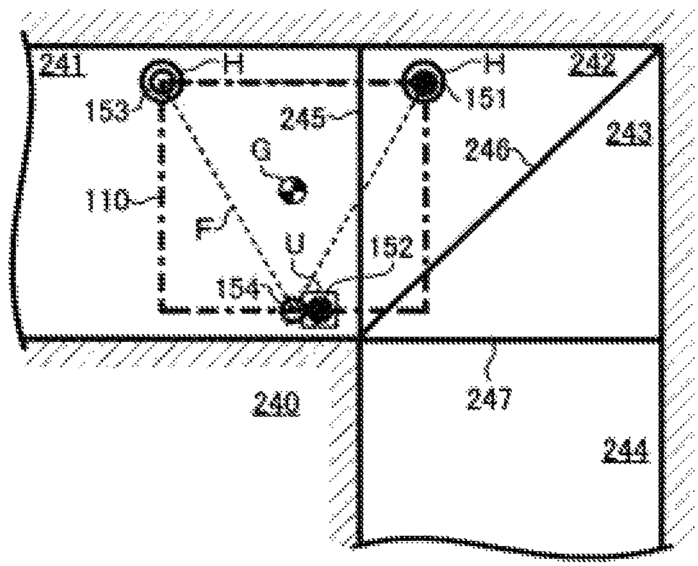
FIG. 49 illustrates a schematic plan view of the transportation device 101 that moves past the route 240.

Next, as shown in FIG. 49, the control part 160 moves the rear-right leg part 144 forward (rightward in the drawing) while braking the drive wheels of the front-left and rear-left traveling units 151, 153, so that the leg part 144 is adjacent to the front-right leg part 142 near the center of the bed 110 as for the moving direction A. Whereby, the support of the bed 110 is passed over from the front-right leg part 142 to the rear-right leg part 144, and thus the leg part 141 can be released from supporting the bed 110.

Figure 50:
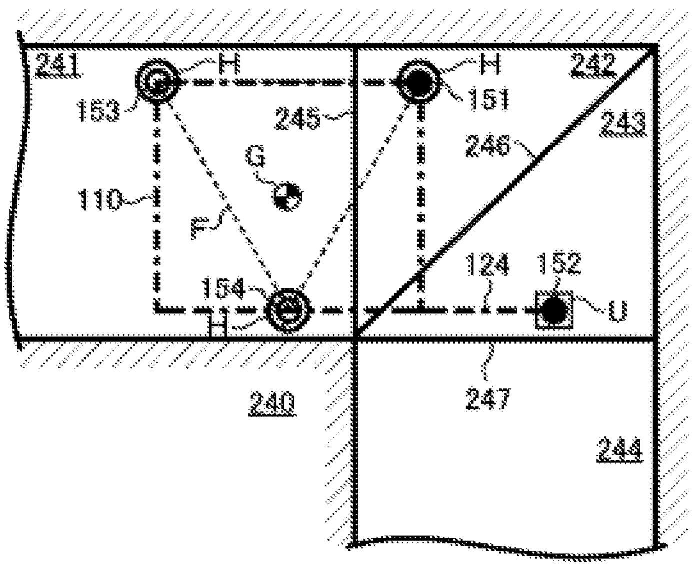
FIG. 50 illustrates a schematic plan view of the transportation device 101 that moves past the route 240.

Next, as shown in FIG. 50, the control part 160 extends the right movable rail 124 forward beyond the bed 110 while the front-right leg part 142 is raised. Moreover, it moves the front-right leg part 142 to the far end of the upper middle step 243 and lands the traveling unit 152 on the floor surface of the upper middle step 243. Whereby, the front-right leg part 142 can be ready to play a part in supporting the bed 110.

Figure 51:
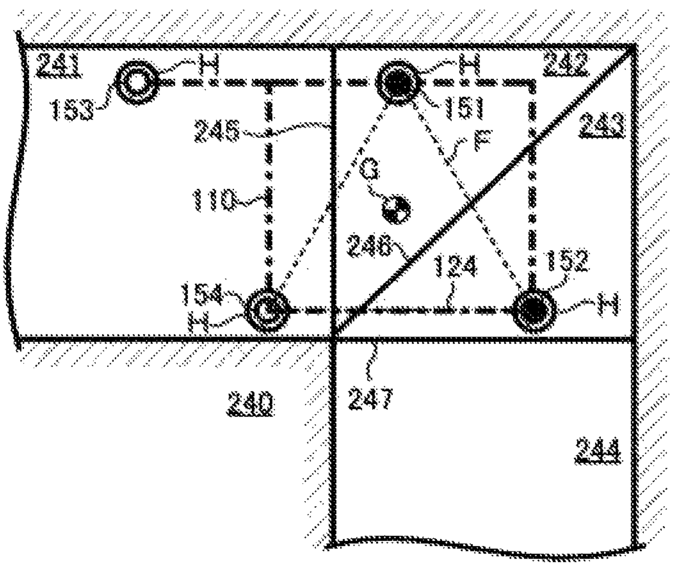
FIG. 51 illustrates a schematic plan view of the transportation device 101 that moves past the route 240.

Next, as shown in FIG. 51, the control part 160 moves the bed 110 forward with respect to the leg parts 141, 142, 143, 144 while braking the drive wheels of all the traveling units 151, 152, 153, 154. Whereby, the front end of the bed 110 comes to the upper middle step 243 and the support of the bed 110 is switched to three leg parts 141, 142, 144 located at the front side. Thus, the rear-left leg part 143 left behind can be released from supporting the bed 110. At this time, the center of gravity G of the bed 110 is located near the center inside the triangle F made by the leg parts 141, 142, 144 located at the front side as apexes, and thus their support of the bed 110 is stable.

Figure 52:
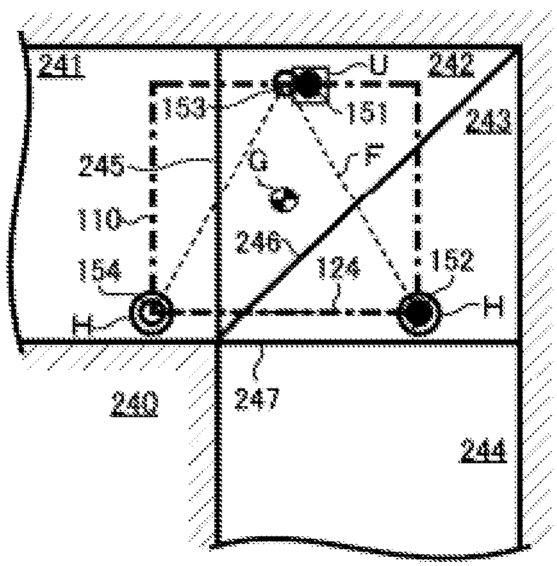
FIG. 52 illustrates a schematic plan view of the transportation device 101 that moves past the route 240.

Next, as shown in FIG. 52, the control part 160 brakes the drive wheels for the front-left and rear-left traveling units 152, 154, and moves the rear-left leg part 143 to above the lower middle step 242 while raising it from the floor surface of the lower step 241 so that it is adjacent to the front-left leg part 141. Thereafter, the control part 160 lands the traveling unit 153 on the floor surface of the lower middle step 242, so that the rear-left leg part 143 can be ready to play a part in supporting the bed 110. At this time, the center of gravity G of the bed is located inside the triangle F made by three leg parts 142, 143, 144 in the drawing, and their support of the bed 110 is stable.

Figure 53:
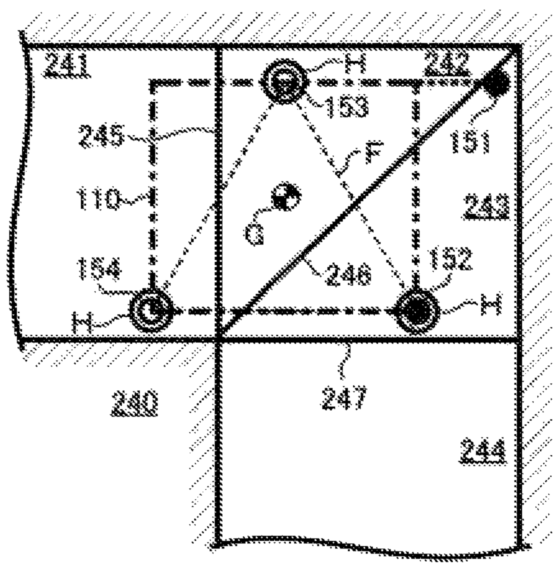
FIG. 53 illustrates a schematic plan view of the transportation device 101 that moves past the route 240.

Next, as shown in FIG. 53, the control part 160 extends the left movable rail 122 forward while braking the drive wheels for the traveling units 152, 153, 154 of the leg parts 142, 143, 144 supporting the bed 110, and moves the traveling unit 151 to above the upper middle step 243 while raising the front-left leg part 141 from the floor surface. Further, the control part 160 lands the traveling unit 151, which has moved to above the upper middle step 243, on the floor surface of upper middle step 243. Whereby, the front-left leg part 141 can be ready to play a part in supporting the bed 110.

Figure 54:
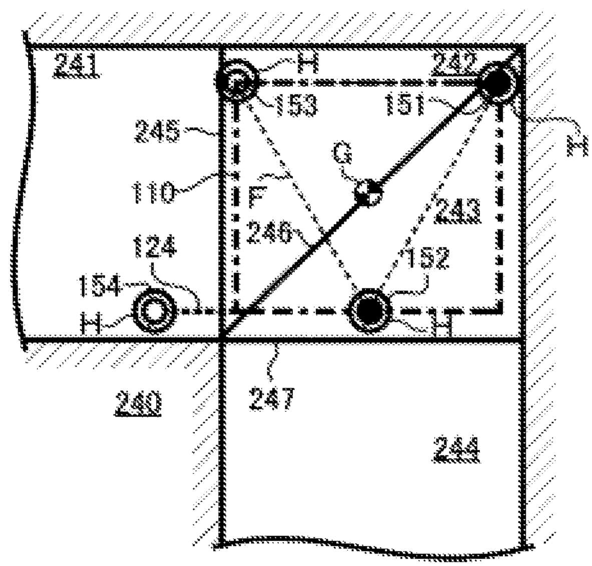
FIG. 54 illustrates a schematic plan view of the transportation device 101 that moves past the route 240.

Next, as shown in FIG. 54, the control part 160 moves the bed 110 forward with respect to the leg parts 141, 142, 143, 144 while braking the drive wheels of all the traveling units 151, 152, 153, 154. Whereby, the bed 110 is supported by three leg parts, the leg parts 141, 142 on the upper middle step 243 and the leg part 143 on the lower middle step 242, and the rear-right leg part 144 can be released from supporting the bed 110. At this time, the center of gravity G of the bed 110 is located near the center inside the triangle F made by the leg parts 141, 142, 143 located at the front side as apexes, and thus their support of the bed 110 is stable.

Figure 55:
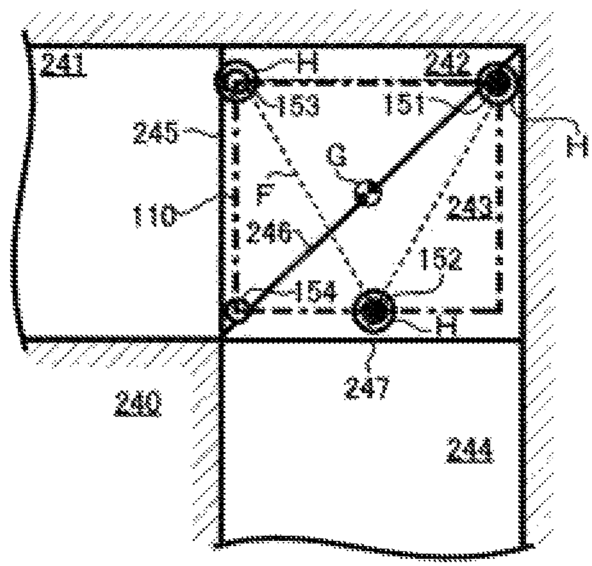
FIG. 55 illustrates a schematic plan view of the transportation device 101 that moves past the route 240.

Next, as shown in FIG. 55, the control part 160 brakes the drive wheels of the traveling units 151, 152, 153 supporting the bed 110 and moves the right movable rail 124 forward while raising the rear-right leg part 144. Whereby, when the rear-right traveling unit 154 reaches the lower middle step 242, the control part 160 stops moving the traveling unit 154. However, at this stage, the traveling unit 154 may not be landed on the floor surface of the lower middle step 242. Therefore, the bed 110 is still supported by three leg parts 141, 142, 143.

Figure 56:
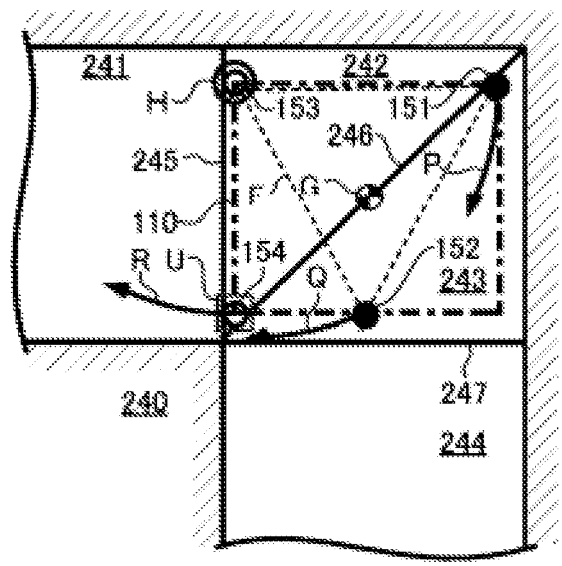
FIG. 56 illustrates a schematic plan view of the transportation device 101 that moves past the route 240.
Figure 57:
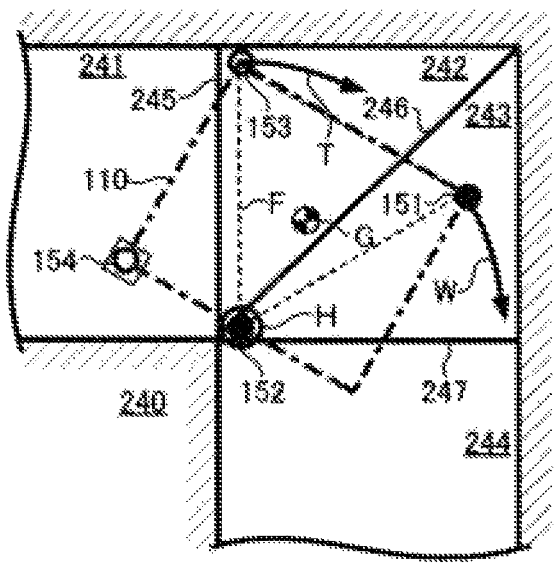
FIG. 57 illustrates a schematic plan view of the transportation device 101 that moves past the route 240.

Next, as shown in FIG. 56, the control part 160 brakes the drive wheel of the rear-left traveling unit 153 and drives the drive wheels of the front-left traveling unit 151 and the front-right traveling unit 152 on the upper middle step 243, as shown by arrows P, Q in the drawing, to make a pivotal turn of the transportation device 101 by 30 degrees about the leg part 143 as the turning axis. Whereby, as shown in FIG. 57, the rear-right traveling unit 154 floats above the lower step 241. However, the bed 110 is supported by three leg parts 141, 142, 143 and the center of gravity G of the bed 110 is located near the center inside the triangle F made by the leg parts 141, 142, 143 as apexes, so that their support of the bed 110 is stable.

Next, as shown also in FIG. 57, the control part 160 drives each of the drive wheels of the front-left traveling unit 151 on the upper middle step 243 and of the rear-left traveling unit 153 on the lower middle step 242, as shown by arrows T, W in the drawing, while braking the drive wheel of the front-right traveling unit 152 on the upper middle step 243 to make a pivotal turn of the transportation device 101 by further 30 degrees. Whereby, as shown in FIG. 58, the front-left traveling unit 151 reaches immediately before the step 247.

Figure 58:
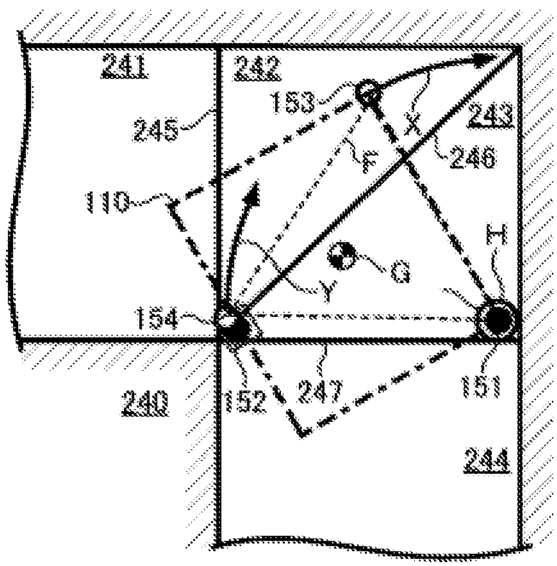
FIG. 58 illustrates a schematic plan view of the transportation device 101 that moves past the route 240.

Next, as shown also in FIG. 58, the control part 160 moves the rear-right leg part 144, which has floated above the lower step 241, forward along the side of the bed 110 to land the rear-right traveling unit 154 again on the floor surface of the lower middle step 242. Then, the drive wheel of the rear-left traveling unit 153 and the drive wheel of the rear-right traveling unit 154 are driven on the lower middle step 242, as shown by arrows X, Y in the drawing, while braking the drive wheel of the front-left traveling unit 151 to make a pivotal turn of the transportation device 101 by further 30 degrees.

Figure 59:
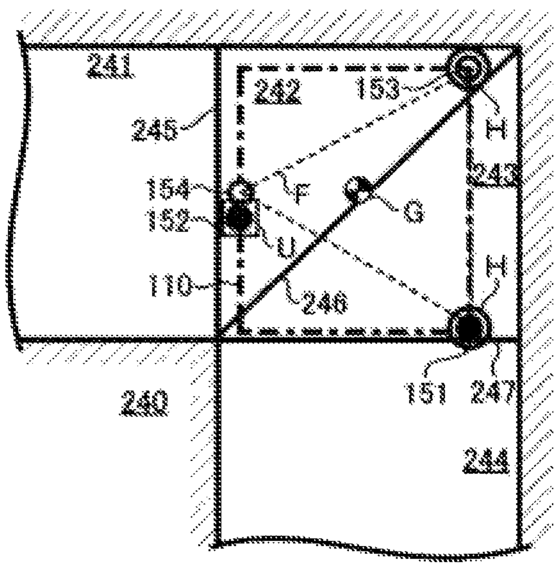
FIG. 59 illustrates a schematic plan view of the transportation device 101 that moves past the route 240.

Whereby, as shown in FIG. 59, the moving direction A of the transportation device has changed its moving direction by 90 degrees as compared to the initial state when it has entered the turning point. At this time, the front-right traveling unit 152 on the upper middle step 243 moves to and floats above the lower middle step 242. However, the bed 110 is supported by the front-left leg part 141 landed on the upper middle step 243 and the rear leg parts 143, 144 landed on the lower middle step 242, and the center of gravity G of the bed is located near the center inside the triangle F made by the leg parts 141, 143, 144 as apexes, so that their support of the bed 110 is stable.

Figure 60:
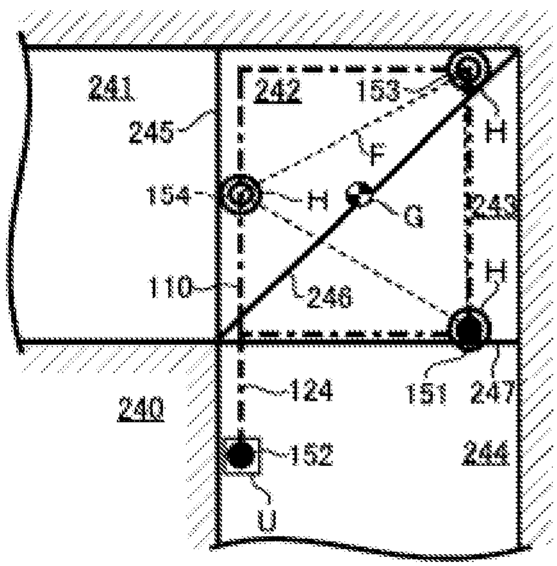
FIG. 60 illustrates a schematic plan view of the transportation device 101 that moves past the route 240.

Next, as shown in FIG. 60, the control part 160 raises the floating front-right leg part 142 further and moves it along with the right movable rail 124 forward beyond the bed 110 while braking the drive wheels of the front-left and rear-left traveling units 151, 153. Then, the control part 160 lands the traveling unit 152 on the floor surface of the upper step 244 of the route 240. Whereby, the front-right leg part 142 can be ready to support the bed 110.

Figure 61:
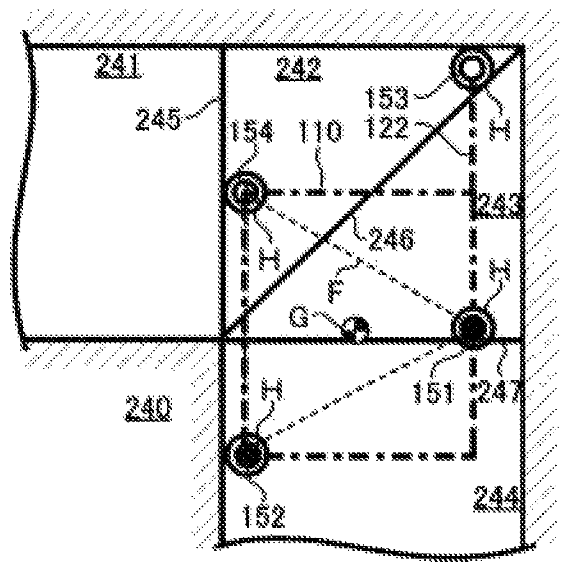
FIG. 61 illustrates a schematic plan view of the transportation device 101 that moves past the route 240.

Next, as shown in FIG. 61, the control part 160 moves the bed 110 forward with respect to the leg parts 141, 142, 143, 144 while braking the drive wheels of all the traveling units 151, 152, 153, 154. Whereby, the front end of the bed 110 comes to the upper step 244. Whereby, the support of the bed 110 is switched to three leg parts 141, 142, 144 located at the relatively front side. A At this time, the center of gravity G of the bed 110 is located near the center inside the triangle F made by the leg parts 141, 142, 144 as apexes, and their support of the bed 110 is stable. Moreover, the rear-left leg part 143 can be released from supporting the bed 110.

Figure 62:
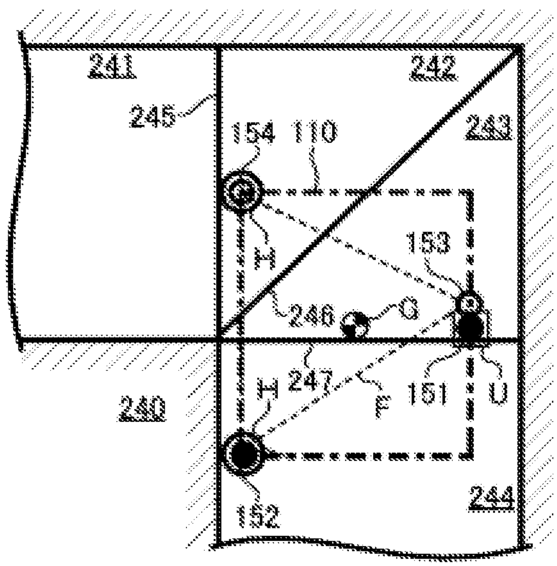
FIG. 62 illustrates a schematic plan view of the transportation device 101 that moves past the route 240.

Next, as shown in FIG. 62, the control part 160 moves the rear-left leg part 143 forward to near the center of the bed 110 as for the moving direction A while braking the drive wheels of the front-right and rear-right traveling units 152, 154, so that the leg part 143 is adjacent to the front-left leg part 141. Whereby, the support of the bed 110 is passed over from the front-left leg part 141 to the rear-left leg part 143, and thus the leg part 141 can be released from supporting the bed 110.

Figure 63:
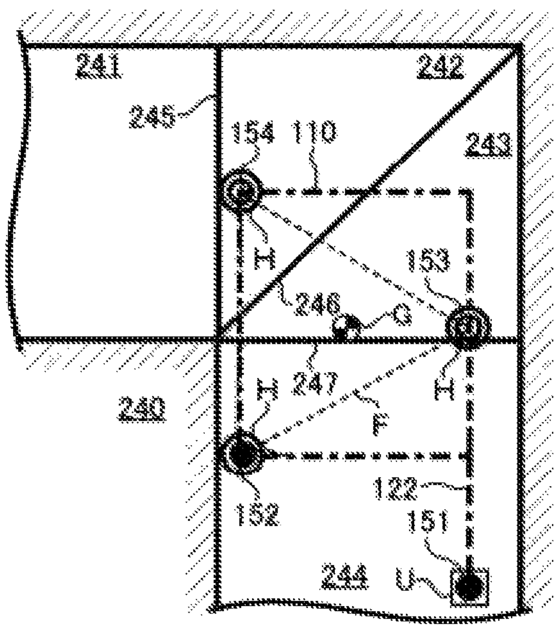
FIG. 63 illustrates a schematic plan view of the transportation device 101 that moves past the route 240.

Next, as shown in FIG. 63, the control part 160 brakes the drive wheels of the traveling units 152, 153, 154 of the leg parts 142, 143, 144 supporting the bed 110 and extends the left movable rail 122 forward beyond the bed 110 while raising the front-left leg part 141. Then, it moves the front-left leg part 141 to above the upper step 244 and lands the traveling unit 151 on the floor surface of the upper step 244. Whereby, the front-left leg part 141 can be ready to play a part in supporting the bed 110.

Next, as shown in FIG. 64, the control part 160 moves the bed 110 forward with respect to the leg parts 141, 142, 143, 144 while braking the drive wheels of all the traveling units 151, 152, 153, 154. Whereby, the front end of the bed 110 as a whole generally comes to the upper step 244 and the support of the bed 110 is switched to three leg parts 141, 142, 143 located at the front side. Thus, the rear-right leg part 144 can be released from supporting the bed 110. At this time, the center of gravity G of the bed 110 is located near the center inside the triangle F made by the leg parts 141, 142, 143 as apexes, and their support of the bed 110 is stable.

Figure 65:
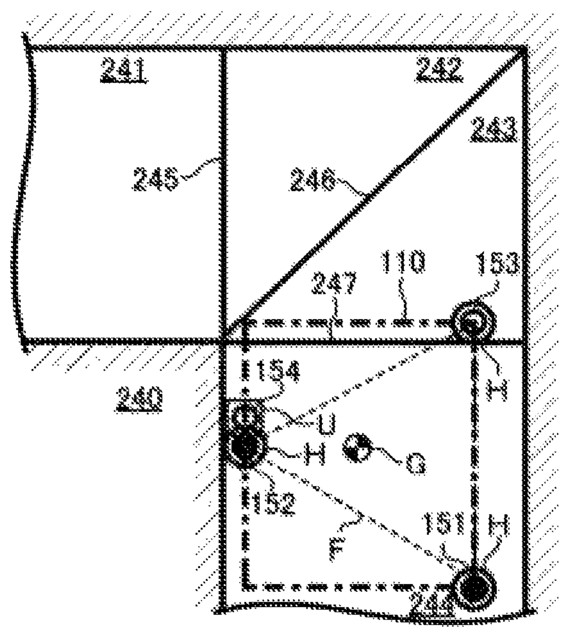
FIG. 65 illustrates a schematic plan view of the transportation device 101 that moves past the route 240.

Next, as shown in FIG. 65, the control part 160 brakes the drive wheels of the traveling units 151, 152, 153 of the leg parts 141, 142, 143 supporting the bed 110 and moves the right movable rail 124 forward while raising the rear-right leg part 144 to move the rear-right leg part 144 to above the upper middle step 243. Thereafter, the control part 160 lands the traveling unit 154 on the upper middle step 243, so that the rear-right leg part 144 can be ready to play a part in supporting the bed 110. Note that, at this stage, the rear-right leg part 144 may skip the upper middle step 243 to move directly to the upper step 244.

After the stage as shown in FIG. 65, the transportation device 101 can be moved by the same procedure as that for the straight route 220 with the step 223, as already described with reference to FIG. 3 through FIG. 32. In this manner, the transportation device 101 can move over the step while changing the direction without taking up much width even in the route 240 having the step 246 in midway of the turning point.

Note that, in the transportation device 101 according to the example above has a structure in which each of the traveling units 151, 152, 153, 154 is separated away from the floor surface by sliding the leg parts 141, 142, 143, 144 vertically with respect to the movable rails 122, 124. However, the structure to separate the traveling units 151, 152, 153, 154 away from the floor surface is not limited to the example above and may be other structures, e.g., rotating a part or whole of the leg parts 141, 142, 143, 144 about a horizontal axis, for example, as long as the movement of the transportation device 101 over the steps 223, 234, 235, 245, 246, 247 is not obstructed.

Figure 66:
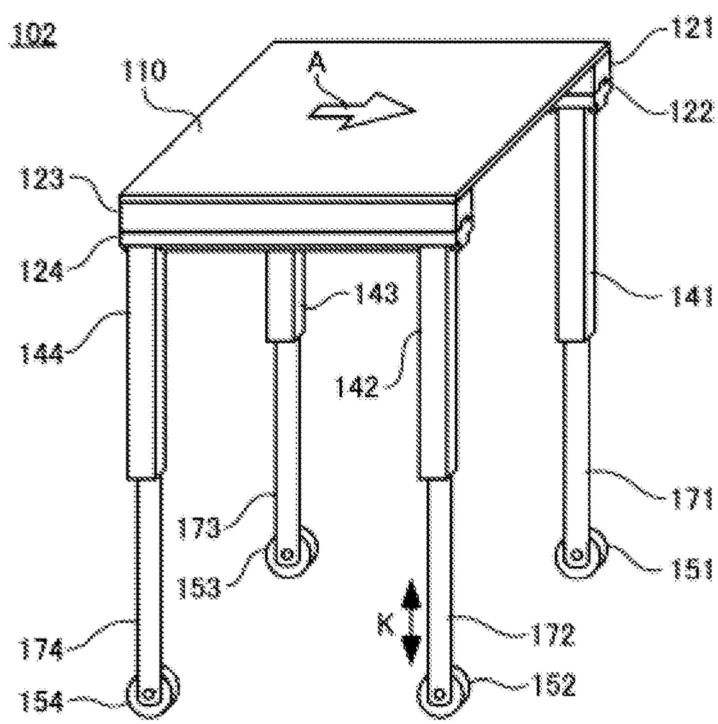
FIG. 66 illustrates a schematic perspective view of a transportation device 102 according to another embodiment.

FIG. 66 is a perspective view showing a configuration of another transportation device 102. The components of the transportation device 102 common with those of the transportation device 101 are denoted by the same reference numbers and the description thereof is omitted.

The transportation device 102 has a structure in that the movable rails 122, 124 are mounted on the upper ends of the leg parts 141, 142, 143, 144, and further the fixed rails 121, 123 are mounted on the movable rails 122, 124. The bed 110 is supported by the fixed rails 121, 123 from below as for the gravitational direction. In this manner, such a structure is employed that the leg parts 141, 142, 143, 144, the movable rails 122, 124, the fixed rails 121, 123, and the bed 110 are stacked sequentially from below in the gravitational direction, thereby the load of the bed 110 can be supported reliably by the simple structure and the mechanical strength of the transportation device 102 can be readily secured.

Note that, for the transportation device 102 as well, the leg parts 141, 142, 143, 144 can change their relative positions with respect to the bed 110 parallel to the moving direction A along the movable rails 122, 124. However, since the movable rails 122, 124 are mounted on the upper ends of the leg parts 141, 142, 143, 144, their relative positions with respect to the bed 110 in the vertical direction cannot be changed.

Thus, the respective leg parts 141, 142, 143, 144 of the transportation device 102 have extending parts 171, 172, 173, 174 at the lower ends. Whereby, the traveling units 151, 152, 153, 154 are disposed at the lower ends of the extending parts 171, 172, 173, 174, respectively. In this manner, for the transportation device 102, the leg parts 141, 142, 143, 144 change their respective lengths individually, thereby substituting for the feature to change their relative positions with respect to the bed 110.

Figure 67:
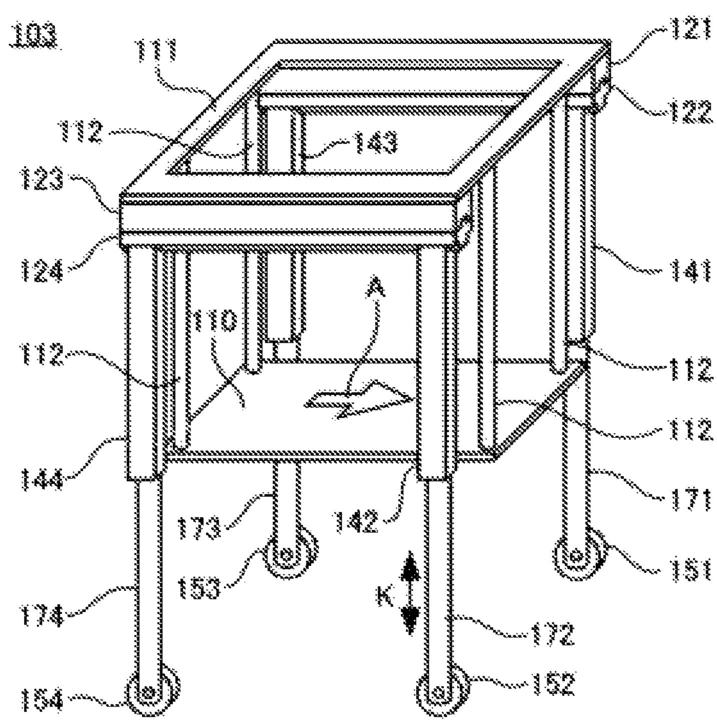
FIG. 67 illustrates a schematic perspective view of a transportation device 103 according to another embodiment.

FIG. 67 is a perspective view showing a configuration of another transportation device 103. The components common with those of the transportation device 102 are denoted by the same reference numbers and the description thereof is omitted.

The transportation device 103 has a different structure from that of the transportation device 102 in that it has a frame 111 supported by the fixed rails 121, 123 from below as for the gravitational direction and the bed 110 has a structure to be suspended from the frame 111 by suspenders 112. Whereby, the center of gravity of the transportation device 103 as a whole is lowered when a cargo is loaded on the bed 110, thereby increasing the stability of the transportation device 103.

Figure 68:
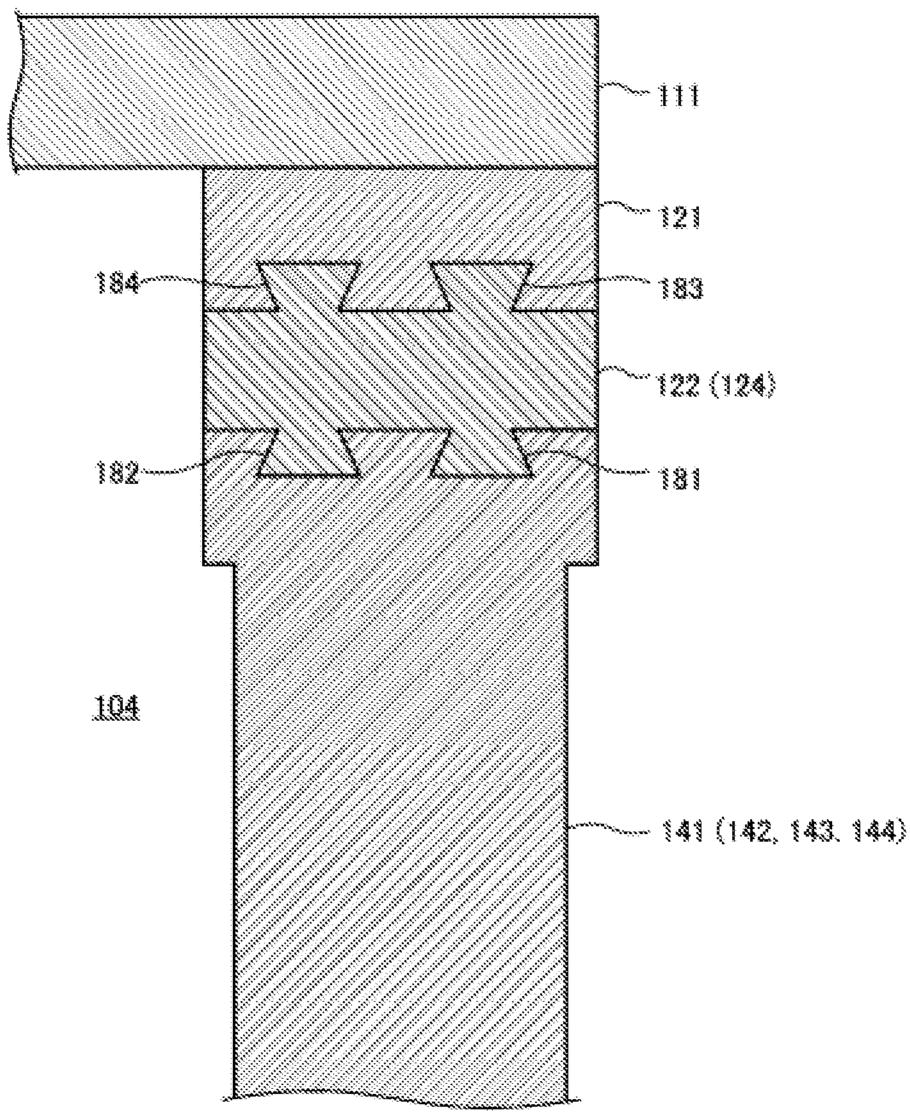
FIG. 68 illustrates a partial enlarged cross-sectional view of a transportation device 104 according to another embodiment.

FIG. 68 is a partial enlarged cross-sectional view of the transportation device 104 having another structure. As with the transportation device 103, the transportation device 104 has a structure having the movable rail 122, the fixed rail 121, and the frame 111 stacked sequentially on the upper end of the leg part 141.

The transportation device 104 has a specific structure in that the leg part 141 and the movable rail 122 are fitted to each other through two dovetail groove structures 181, 182. This improves the attachment strength of the leg part 141 to the movable rail 122, so that the load resistance performance as the transportation device 104 can be improved.

The transportation device 104 has a specific structure in that the movable rail 122 and the fixed rail 121 are fitted to each other through two dovetail groove structures 183, 184. This improves the attachment strength of the movable rail 122 to the fixed rail 121, so that the load resistance performance as the transportation device 104 can be improved.

The fitting by means of a plurality of dovetail groove structures as above is not limited to the connection between the leg part 141 and the movable rail 122, it is also applicable of course to the connection between other leg parts 142, 143, 144 and the movable rails 122, 124. Moreover, the number of the dovetail groove structures is not limited to two, and the sectional shape of the fitting structure can be selected from existing ones.

Similarly, the fitting by means of a plurality of dovetail groove structures is not limited to the connection between the movable rail 122 and the fixed rail 121, it is also applicable to the other connection between the movable rail 124 and the fixed rail 123. Further, as with the case of the leg parts 141, 142, 143, 144, the number of the dovetail groove structures is not limited to two, and the sectional shape of the fitting structure can be changed.

While the embodiments of the present invention have been described, the technical scope of the present invention is not limited to the scope described in the above embodiments. It is apparent to persons skilled in the art that various alterations or improvements can be added to the above-described embodiments. It is also apparent from the description of the claims that the embodiments added with such alterations or improvements can be included in the technical scope of the present invention.

It should be noted that the operations, procedures, steps, stages, and the like of each process performed by an apparatus, system, program, and method shown in the claims, embodiments, and drawings can be performed in any order as long as the order is not indicated by "prior to," "before," or the like and as long as the output from a previous process is not used in a later process. Even if the process flow is described expediently using terms such as "first" or "next" in the claims, specification, and drawings, it does not necessarily mean that the process must be performed in this order.

EXPLANATION OF REFERENCES

101, 102, 103, 104, 105: transportation device
110, 113: bed
111: frame
112: suspender
120: rail part
121, 123: fixed rail
122, 124: movable rail
131, 132, 133, 134: movable unit
141, 142, 143, 144: leg part
151, 152, 153, 154: traveling unit
160: control part
171, 172, 173, 174: extending part
181, 182, 183, 184: dovetail groove structure
210, 220, 230, 240: route
221, 231, 241: lower step
222, 233, 244: upper step
232: middle step
223, 234, 235, 245, 246, 247: step
242: lower middle step
243: upper middle step

What is claimed is:

1. A transportation device for loading a cargo and moving in a moving direction, comprising:

a bed configured to load a cargo thereon;

four leg parts configured to be able to receive a part of a weight of the bed individually;

a movable part configured to move the leg parts individually to change relative positions with respect to the bed individually;

a control part configured to control the movable part for the four leg parts individually; and a pair of rail members configured to be slidable with respect to the bed in the moving direction of the bed, wherein the control part is configured to change the relative position of at least one of the four leg parts with respect to the bed to within a range in which a center of gravity of the bed is located inside a profile of a horizontal triangle made by three leg parts among the four leg parts as apexes, causing the three leg parts to support the bed and releasing another one leg part from supporting the bed, and wherein the four leg parts are coupled slidingly with respect to the pair of rail members in an extending direction of the pair of rail members and configured to support the bed via the pair of rail members.

2. The transportation device according to claim 1, wherein the control part is configured to, when causing the three leg parts to support the bed, move at least one of the three leg parts to move the center of gravity of the bed closer to a center of the triangle.

3. The transportation device according to claim 2, wherein the control part is configured to raise one of the four leg parts as for a gravitational direction, thereby causing other three of the four leg parts to support the bed.

4. The transportation device according to claim 3, wherein, when a step is present in front in the moving direction, the control part is configured to move one of the four leg parts in a direction to separate away from a floor surface and a forward direction as for a moving direction of the bed to land the one leg part on a position past the step while the other three of the four leg parts support the bed, and after that, move the bed in the forward direction with respect to the four leg parts to cause three leg parts, which are two leg parts among the other three leg parts and the one leg part, to support the bed.

5. The transportation device according to claim 3, further comprising a traveling part provided individually to each of the four leg parts and configured to be able to change a traveling direction and a traveling speed individually under control of the control part.

6. The transportation device according to claim 2, wherein, when a step is present in front in the moving direction, the control part is configured to move one of the four leg parts in a direction to separate away from a floor surface and a forward direction as for a moving direction of the bed to land the one leg part on a position past the step while the other three of the four leg parts support the bed, and after that, move the bed in the forward direction with respect to the four leg parts to cause three leg parts, which are two leg parts among the other three leg parts and the one leg part, to support the bed.

7. The transportation device according to claim 2, further comprising a traveling part provided individually to each of the four leg parts and configured to be able to change a traveling direction and a traveling speed individually under control of the control part.

8. The transportation device according to claim 2, wherein the four leg parts are configured to support the bed from below as for the gravitational direction.

9. The transportation device according to claim 1, wherein, when a step is present in front in the moving direction, the control part is configured to move one of the four leg parts in a direction to separate away from a floor surface and a forward direction as for a moving direction of the bed to land the one leg part on a position past the step while the other three of the four leg parts support the bed, and after that, move the bed in the forward direction with respect to the four leg parts to cause three leg parts, which are two leg parts among the other three leg parts and the one leg part, to support the bed.

10. The transportation device according to claim 1, further comprising a traveling part provided individually to each of the four leg parts and configured to be able to change a traveling direction and a traveling speed individually under control of the control part.

11. The transportation device according to claim 10, wherein, when changing the moving direction of the transportation device, the control part is configured not to cause a traveling part closer to a turning axis to travel in the moving direction while driving a traveling part farther from the turning axis in the moving direction, so as to make a pivotal turn of the bed.

12. The transportation device according to claim 11, wherein in a state where a pair of leg parts farther from the turning axis are disposed at positions separate from each other as for the moving direction and at least one of a pair of leg parts closer to the turning axis is disposed at a center as for the moving direction so that at least three leg parts support the bed, the control part is configured to make a pivotal turn of the bed along the triangle using apexes of the triangle as a turning axis sequentially in a reverse order to a turning direction of the bed.

13. The transportation device according to claim 1, wherein each of the pair of rail members is configured to project forward or rearward beyond the bed as for the moving direction of the bed when having slided with respect to the bed so as to support any of the leg parts at a forward or rearward position beyond the bed.

14. The transportation device according to claim 13, wherein each of the pair of rail members is coupled to the bed via two fitting parts extending parallel with each other.

15. The transportation device according to claim 1, wherein each of the pair of rail members is coupled to the bed via two fitting parts extending parallel with each other.

16. The transportation device according to claim 1, wherein the four leg parts are configured to support the bed from below as for the gravitational direction.

17. The transportation device according to claim 1, further comprising:

a frame is supported by the four leg parts from below as for the gravitational direction, wherein the bed is supported in a state suspended from the frame.

* * * * *